US012327198B1

(12) United States Patent
Cichy et al.

(10) Patent No.: US 12,327,198 B1
(45) Date of Patent: Jun. 10, 2025

(54) TECHNOLOGIES FOR ENABLING RULES ENGINES TO GUIDE END USERS IN COMPLETING TRANSACTIONS

(71) Applicant: Monarch Specialty Group, Inc., Chicago, IL (US)

(72) Inventors: Stephen Barrett Cichy, Chicago, IL (US); Markus Daniel Bockle, Chicago, IL (US)

(73) Assignee: Monarch Specialty Group, Inc., Chicago, IL (US)

( * ) Notice: Subject to any disclaimer, the term of this patent is extended or adjusted under 35 U.S.C. 154(b) by 0 days.

(21) Appl. No.: 18/909,437

(22) Filed: Oct. 8, 2024

(51) Int. Cl.
*G06N 5/025* (2023.01)
*G06Q 40/08* (2012.01)

(52) U.S. Cl.
CPC ............. *G06N 5/025* (2013.01); *G06Q 40/08* (2013.01)

(58) Field of Classification Search
CPC .............................. G06Q 40/08; G06N 5/025
USPC .............................................................. 705/4
See application file for complete search history.

(56) References Cited

U.S. PATENT DOCUMENTS

| | | | |
|---|---|---|---|
| 7,111,780 B2 | 9/2006 | Broussard | |
| 7,840,424 B2 | 11/2010 | Wiley, II | |
| 7,856,364 B1 | 12/2010 | Wiley, II | |
| 7,979,285 B2 | 7/2011 | Wiley | |
| 8,032,397 B2 | 10/2011 | Lawless | |
| 8,036,913 B1 | 10/2011 | Pinsonneault | |
| 8,036,914 B1 | 10/2011 | Pinsonneault | |
| 8,036,918 B1 | 10/2011 | Pinsonneault | |
| 8,050,943 B1 | 11/2011 | Wiley | |
| 8,060,379 B1 | 11/2011 | Pinsonneault | |
| 8,190,453 B2 | 5/2012 | Rowe, III | |
| 8,392,214 B1 | 3/2013 | Pinsonneault | |
| 8,392,219 B1 | 3/2013 | Pinsonneault | |
| 8,589,181 B2 | 11/2013 | Berzansky | |
| 8,670,999 B2 | 3/2014 | Berzansky | |
| 8,781,854 B1 | 7/2014 | Harris, Sr. | |
| 8,924,231 B2 | 12/2014 | Hoffman | |
| 9,076,186 B2 | 7/2015 | Burkett | |
| 9,231,935 B1 | 1/2016 | Bridge | |
| 9,760,871 B1 | 9/2017 | Pourfallah | |
| 9,904,965 B2 | 2/2018 | White | |
| 10,157,262 B1 | 12/2018 | Pinsonneault | |
| 10,192,193 B1 | 1/2019 | Glass | |
| 10,248,641 B2 | 4/2019 | Wagh | |
| 10,417,380 B1 | 9/2019 | Kaye | |
| 10,489,552 B2 | 11/2019 | Pinsonneault | |
| 10,496,793 B1 | 12/2019 | Lawrence | |
| 10,565,656 B1 | 2/2020 | Pinsonneault | |
| 10,616,146 B1 | 4/2020 | Hopkins | |
| 11,151,331 B1* | 10/2021 | Santhar | G06F 40/35 |
| 12,013,824 B1* | 6/2024 | Reeves | G06F 11/302 |
| 2004/0088198 A1* | 5/2004 | Childress | G06Q 40/02 705/4 |
| 2004/0153336 A1 | 8/2004 | Virdee | |
| 2007/0276697 A1 | 11/2007 | Wiley | |

(Continued)

*Primary Examiner* — Robert R Niquette
(74) *Attorney, Agent, or Firm* — Dentons US LLP

(57) ABSTRACT

This disclosure enables a rules engine programmed for (i) expressing complex logic, (ii) handling time/event synchronization, (iii) providing insights into rule execution, and (iv) modeling uncertainties. Such configuration is technologically advantageous, because of its enablement of providing guidance to end users in completing transactions.

30 Claims, 6 Drawing Sheets

(56) References Cited

U.S. PATENT DOCUMENTS

| | | |
|---|---|---|
| 2009/0099982 A1* | 4/2009 | Heuler ............... G06Q 10/0637 706/11 |
| 2010/0217622 A1 | 8/2010 | Brown |
| 2011/0145011 A1 | 6/2011 | Shell |
| 2013/0054261 A1 | 2/2013 | Dufour |
| 2013/0211856 A1 | 8/2013 | Pribyl |
| 2013/0226608 A1 | 8/2013 | Di Lascia |
| 2014/0200928 A1 | 7/2014 | Watanabe |
| 2015/0228030 A1 | 8/2015 | Scantland |
| 2015/0234991 A1 | 8/2015 | Pinsonneault |
| 2024/0296501 A1 | 9/2024 | Cichy |

* cited by examiner

TECHNOLOGIES FOR ENABLING RULES ENGINES TO GUIDE END USERS IN COMPLETING TRANSACTIONS

TECHNICAL FIELD

This disclosure relates to rules engines that guide end users in completing transactions.

BACKGROUND

Conventionally, a rules engine may be programmed to apply a business rule to an input (e.g., a message) received from a data source (e.g., an application program). This modality of computing promotes agility and adaptability for processes driven by dynamic rules and regulations, by decoupling a business logic from an application logic, thereby allowing a business user to modify the business logic, by modifying the business rule, without changing the application logic, especially when the data source is subject to change. Resultantly, the rules engine may be forward-chaining (e.g., processing condition-action rules) or reactive (e.g., detecting and reacting to events and patterns). However, despite the rules engine having such technological benefits, the rules engine still suffers from various technological drawbacks. For example, the rules engine may be limited in (i) expressing complex logic, (ii) handling time/event synchronization, (iii) providing insights into rule execution, and (iv) modeling uncertainties.

SUMMARY

This disclosure enables a rules engine programmed for (i) expressing complex logic, (ii) handling time/event synchronization, (iii) providing insights into rule execution, and (iv) modeling uncertainties. Such configuration is technologically advantageous, because of its enablement of providing guidance to end users in completing transactions.

DETAILED DESCRIPTION

Figure 1:
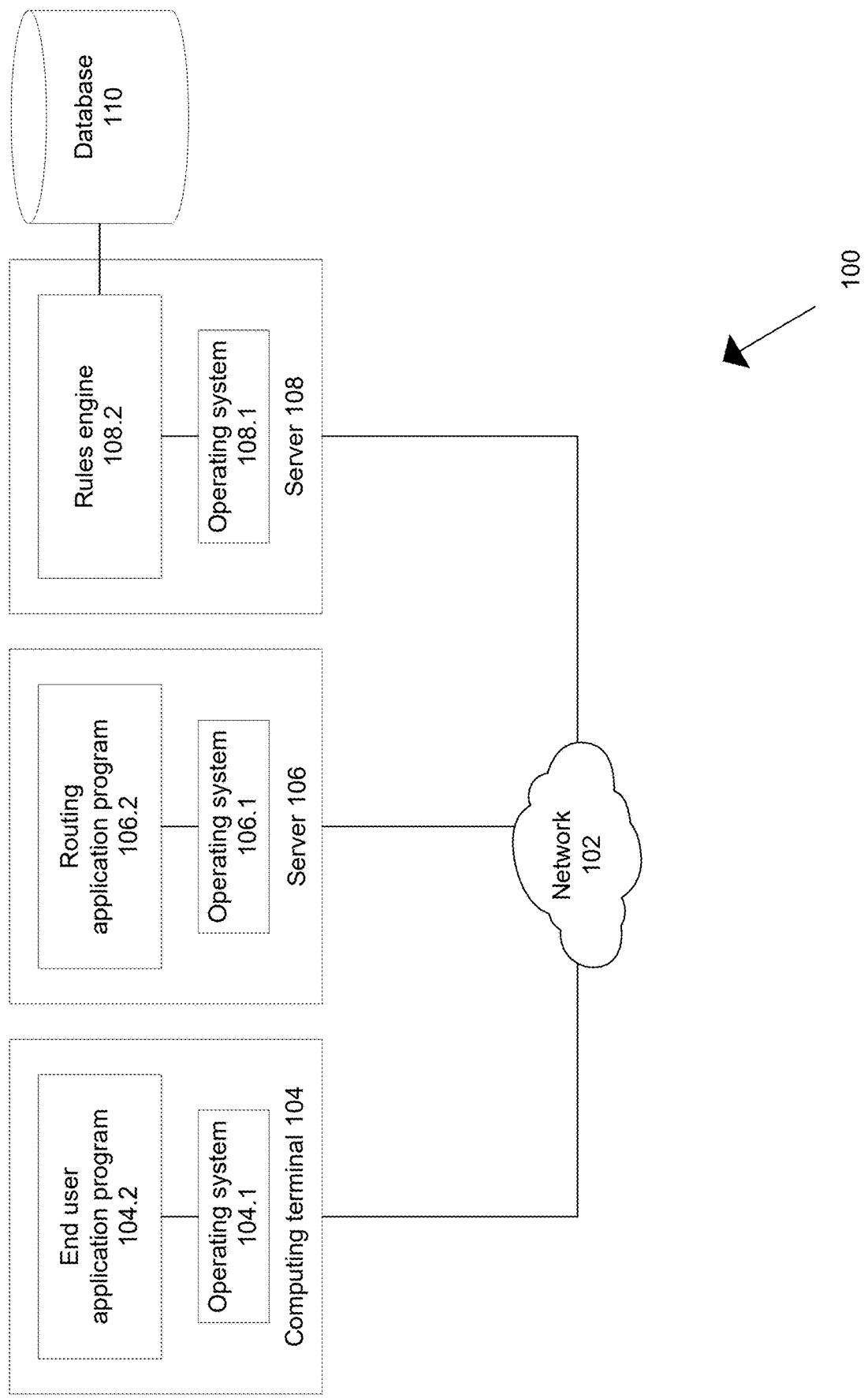
FIG. 1 shows a diagram of a first embodiment of a system for providing guidance to end users in completing transactions according to this disclosure.

As explained above, this disclosure enables a rules engine programmed for (i) expressing complex logic, (ii) handling time/event synchronization, (iii) providing insights into rule execution, and (iv) modeling uncertainties. Such configuration is technologically advantageous, because of its enablement of providing guidance to end users in completing transactions.

This disclosure is now described more fully with reference to various figures that are referenced above, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled persons.

Various terminology used herein can imply direct or indirect, full or partial, temporary or permanent, action or inaction, individual or collective. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of natural inclusive permutations. That is, if X employs A; X employs B; or X employs both A and B, then "X employs A or B" is satisfied under any of foregoing instances.

Similarly, as used herein, various singular forms "a," "an" and "the" are intended to include various plural forms (e.g., two, three, four) as well, unless context clearly indicates otherwise. For example, a term "a" or "an" shall mean "one or more," even though a phrase "one or more" is also used herein.

Moreover, terms "comprises," "includes," "contains," "has," or "comprising," "including," "containing," or "having" (or any tenses thereof) when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

As used herein, relative terms such as "below," "lower," "above," and "upper" can be used herein to describe one element's relationship to another element as illustrated in the set of accompanying illustrative drawings. Such relative terms are intended to encompass different orientations of illustrated technologies in addition to an orientation depicted in the set of accompanying illustrative drawings. For example, if a device in the set of accompanying illustrative drawings were turned over, then various elements described as being on a "lower" side of other elements would then be oriented on "upper" sides of other elements. Similarly, if a device in one of illustrative figures were turned over, then various elements described as "below" or "beneath" other elements would then be oriented "above" other elements. Therefore, various example terms "below" and "lower" can encompass both an orientation of above and below.

Additionally, although terms first, second, and others can be used herein to describe various elements, components, regions, layers, subsets, diagrams, or sections, these elements, components, regions, layers, subsets, diagrams, or sections should not necessarily be limited by such terms. Rather, these terms are used to distinguish one element, component, region, layer, subset, diagram, or section from another element, component, region, layer, subset, diagram, or section. As such, a first element, component, region, layer, subset, diagram, or section discussed below could be termed a second element, component, region, layer, subset, diagram, or section without departing from this disclosure.

As used herein, a term "about" or "substantially" refers to a +/−10% variation from a nominal value/term. Such variation is always included in any given value/term provided herein, whether or not such variation is specifically referred thereto.

As used herein, a term "or others," "combination", "combinatory," or "combinations thereof" refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. Skilled persons understand that typically there is no limit on a number of items or terms in any combination, unless otherwise contextually apparent.

Features or functionality described with respect to certain embodiments may be combined or sub-combined in or with various embodiments in any permutational or combinatorial manner. Different aspects or elements of embodiments, as disclosed herein, may be combined or sub-combined in a similar manner. A skilled person will understand that typically there is no limit on a number of items or terms in any combination, unless otherwise contextually apparent Some embodiments, whether individually or collectively, can be components of a larger system, where other procedures can take precedence over or otherwise modify their application. Additionally, a number of steps can be required before, after, or concurrently with embodiments, as disclosed herein. Note that any or all methods or processes, at least as disclosed herein, can be at least partially performed via at least one entity in any manner.

Some embodiments are described herein with reference to illustrations of idealized embodiments (and intermediate structures) of this disclosure. As such, variations from various illustrated shapes as a result, for example, of manufacturing techniques or tolerances, are to be expected. Thus, various embodiments should not be construed as necessarily limited to various particular shapes of regions illustrated herein, but are to include deviations in shapes that result, for example, from manufacturing.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

United States Patent Application Publication 2022/0398667 (Ser. No. 17/399,178) is incorporated by reference herein for all purposes. Hereby, all issued patents, published patent applications, and non-patent publications that are mentioned or referred to in this disclosure are herein incorporated by reference in their entirety for all purposes, to a same extent as if each individual issued patent, published patent application, or non-patent publication were specifically and individually indicated to be incorporated by reference. To be even more clear, all incorporations by reference specifically include those incorporated publications as if those specific publications are copied and pasted herein, as if originally included in this disclosure for all purposes of this disclosure. Therefore, any reference to something being disclosed herein includes all subject matter incorporated by reference, as explained above. However, if any disclosures are incorporated herein by reference and such disclosures conflict in part or in whole with this disclosure, then to an extent of the conflict or broader disclosure or broader definition of terms, this disclosure controls. If such disclosures conflict in part or in whole with one another, then to an extent of conflict, the later-dated disclosure controls.

FIG. 1 shows a diagram of a first embodiment of a system for providing guidance to end users in completing transactions according to this disclosure. In particular, there is a system 100 containing a network 102, a computing terminal 104, a server 106 (first), a server 108 (second), and a database 110. The computing terminal 104 hosts an operating system (OS) 104.1 and an end user application program 104.2 such that the end user application program 104.2 runs on the OS 104.1. The server 106 hosts an OS 106.1 and a routing application program 106.2 such that the routing application program 106.2 runs on the OS 106.1. The server 108 hosts an OS 108.1 and a rules engine 108.2 such that the rules engine 108.2 runs on the OS 108.1.

The network 102 may be a Local Area Network (LAN), a Wide Area Network (WAN), a cellular network, a satellite network, or another suitable network, whether private or public. The network may include Internet.

The computing terminal 104 may be a desktop computer, a laptop computer, a tablet computer, a mobile phone, a smartphone, a wearable computer, a vehicular computer, a Point-Of-Sale computing terminal (e.g., a cash register), or another suitable computing form factor, whether stationary or mobile. For example, the computing terminal 104 may be a positioned in a defined area (e.g., a room, a building, a store, a pharmacy, a hospital). For example, the computing terminal 104 may be a computing workstation that is free-standing, stationary, or standalone on a surface, such as a shelf, a tabletop, a floor, a carpet, a tile, or another suitable surface. For example, the computing workstation may be a desktop Personal Computer (PC) tower, a microtower, a slim form factor, an All-In-One (AIO) desktop PC, a mini PC, a Small Form Factor (SFF), an Ultra SFF, a Nettop, an ultra-compact, a mini PC, a PC-on-a-Stick, or another suitable form factor. For example, the computing workstation may avoid itself having a display, but is connected (e.g., wired, wireless, waveguide) to a computer monitor, a keyboard, a cursor control device (e.g., a mouse, a touchpad), a printer, or another suitable computing peripheral. For example, the computing workstation may be a kiosk. For example, the computing workstation may be powered from a mains electrical socket.

The OS 104.1 may be Windows, Linux, MacOS, Android, IOS, or any other suitable OS.

The end user application program 104.2 runs on the OS 104.1. The end user application program 104.2 may be a browser application program, a domain specific application program, or another suitable program. For example, the domain specific application program 104.2 may be a pharmacy application program (e.g., operated by a pharmacist or a pharmacy technician in a pharmacy locale) having a software logic/UIs programmed to manage prescriptions (e.g., by identifiers), a software logic/UI programmed to manage inventory of medications (e.g., by identifiers), a software logic/UIs programmed to provide patient management/safety (e.g., by identifiers), a software logic/UIs programmed to manage regulatory compliance (e.g., by permissioning for patient privacy, controlled substances, state laws), and a software logic/UIs programmed to integrate with third party computing systems (e.g., by electronic health records, insurance e-billing).

The server 106 is remote to the computing terminal 104. The server 106 may be an application server or another suitable server. The server 106 may be operated by an entity different from an entity operating the computing terminal 104.

The OS 106.1 may be Windows, Linux, MacOS, Android, IOS, or any other suitable OS.

The routing application program 106.2 runs on the OS 106.1. The routing application program 106.2 may be a message routing program that is programmed to facilitate efficient receiving, processing, and sending messages between various computing systems to enable corresponding transactions to be completed. For example, a transaction may correspond to a single message (one-to-one) or a set of messages (one-to-many). For example, the routing application program 106.2 may be a medical claim application program that is programmed to facilitate efficient receiving, processing, and sending of messages, which embody medical claims by content (e.g., text), submitted by pharmacies to insurance companies or payers. The medical claim application program may have a software logic/UIs programmed to route messages (e.g., medical claims) submitted by pharmacies computing systems to appropriate insurance computing systems or pharmacy benefit manager computing systems based on appropriate insurance coverage and plan information as validated based on contents of those messages. The medical claim application program may have a software logic/UIs programmed to perform initial editing and validation of messages (e.g., medical claims) to ensure that those messages meet a certain required format (if needed) and contain accurate data. The medical claim application program may have a software logic/UIs programmed to perform real-time transacting (e.g., adjudication by approval or denial) of messages (e.g., medical claims) by seamlessly integrating with payers' claims computing processing systems. The medical claim application program may have a software logic/UIs programmed to perform tracking and monitoring of statuses of submitted messages (e.g., medical claims), as well as generating reports and analytics. The medical claim application program may have a software logic/UIs programmed to integrate with existing pharmacy computing management systems, enabling seamless submission of messages (e.g., medical claims) from pharmacy workflows, while minimizing or eliminating manual data entry or separate computing systems.

The routing application program 106.2 may be programmed to convert messages from one data format (e.g., flat file, matrix format, National Council for Prescription Drug Programs (NCPDP) format) to another data format (e.g., structured, delimited, Java Script Object Notation (JSON), Extensible Markup Language (XML), Comma Separated Values (CSV)) or vice versa, although this functionality is not required. For example, the routing application program 106.2 may receive a message (e.g., a request) in one data format and convert the message into another data format before routing further. For example, the message may be received in a flat file data format, a matrix data format, a NCPDP format, or another suitable format. For example, the message may have the format of a flat file format for transmitting messages (e.g., pharmacy claims and related transactions), where the message may contain segments and segments may contain fields, where each field may contain a single data element (e.g., a name, a identifier, a drug code, a quantity), where fields and segments may be separated by non-printable ASCII characters, such as a record separator and a field separator, where the format may support various data types, such as strings, dates, integers, and decimal numbers, where numeric fields can be zero-padded, or use a "signed overpunch" technique to encode negative values. For example, for batch transmission, the format may define headers and trailers to separate multiple transactions within a single file, such as using separators to indicate start of text and end of text. For example, the format may be a flat file format having segments separated by record separators, with fields within segments separated by field separators, supporting different data types using techniques, such as zero-padding and signed overpunch. For example, the format may be NCPDP or another suitable format. However, note that there may be an Application Programming Interface (API) separate and distinct from the routing application program 106.2, external to the routing application program 106.2, although the API may be a component of the routing application program 106.2. As such, the API may be hosted on the server 106, the server 108, or another server communicating with the network 102. For example, the API may be logically positioned between the routing application program 106.2 and the rules engine 108.2. For example, the API may be a Representational State Transfer (REST) API, a Simple Object Access Protocol (SOAP) API, or another suitable API. The API may be programmed to receive a message (e.g., a medical claim) from the routing application program 106.2 and convert, similar to above, the message from one data format (e.g., NCPDP format, structured format, JSON format, XML format, delimited format) to another data format (e.g., structured format, JSON format, XML format, delimited format, NCPDP format) before submitting or passing the message, as converted (or a copy thereof), to the rules engine 108.2 to process the message, as converted (or a copy thereof), as disclosed herein. Likewise, the API may be programmed to receive a message (e.g., an approval or a denial of a medical claim) from the rules engine 108.2 and convert, similar to above, the message from one data format (e.g., structured format, JSON format, XML format, delimited format, NCPDP format) to another data format (e.g., NCPDP format, structured format, JSON format, XML format, delimited format) before submitting or passing the message, as converted (or a copy thereof), to the routing application program 106.2 to process the message, as converted (or a copy thereof), as disclosed herein.

The routing application program 106.2 may be programmed to route messaging based on parsing (e.g., textually) those messages. For example, such routing may occur based on a set of predefined business rules and logic to determine various appropriate paths and destinations for received messages (e.g., medical claims). As such, in context of medical claim processing, the routing application program 106.2 may have a message intake logic (e.g., a software module) that receives messages (e.g., medical claims) from various sources, such as providers, clearinghouses, or other healthcare entities (e.g., formatted pursuant to Electronic Data Interchange (EDI) X12 837). Further, the routing application program 106.2 may have a claim parsing logic (e.g., a software module) that parses (e.g., by text) messages (e.g., medical claims) to extract relevant information (e.g., text), such as patient details, provider information, diagnosis codes, procedure codes, and insurance details. Also, the routing application program 106.2 may have a rule evaluation logic (e.g., a software module) that, based on extracted claim data, evaluates a set of predefined business rules to determine an appropriate routing path. For example, these rules can be based on various factors, such as patient's insurance plan and network affiliations, provider's participation in specific networks or Preferred Provider Organizations (PPOs), geographic location of the provider or patients, claim type (e.g., medical, dental, institutional), presence of specific diagnosis or procedure codes, or other suitable factors. Moreover, the routing application program 106.2 may have a routing destination determination logic (e.g., a software module) that, based on evaluated rules, identifies appropriate destination(s) for routing messages (e.g., medical claims), such as computing systems (e.g., APIs, File Transfer Protocol (FTP) sites, web portals) of payers or insurance companies, third-party administrators, repricing vendors or PPO networks, auditing or review entities, or other suitable destinations. Furthermore, the routing application program 106.2 may have a claim transmission logic (e.g., a software module) that transmits messages (e.g., medical claims) to identified destination(s) using appropriate EDI formats or secure FTP sites, APIs, web portals or other suitable data recipient software. This may involve point-to-point routing (e.g., direct transmission to recipients) or wrap routing (routing through intermediary networks or entities). Also, the routing application program 106.2 may have a tracking and auditing logic (e.g. a software module) that enables maintenance of an audit trail, tracking how messages move among data recipients and status throughout routing processes, such as by monitoring timestamps, recipient information, and any errors or exceptions encountered during routing. Additionally, the routing application program 106.2 may be have an exception handling logic (e.g., a software module) that handles issues or exceptions that may arise during routing (e.g., invalid data, missing information, rule conflicts), which may involve or enable alerts, notifications, or manual intervention workflows to resolve identified issues.

The server 108 is remote to the computing terminal 104. The server 108 may be remote to the server 106 or local to the server 106. The server 108 may be an application server or another suitable server. The server 108 may be operated by an entity different from an entity operating the computing terminal 104 or the server 106. The server 108, whether physical or virtual, may be a component of a cloud computing instance, which, in some embodiments, may be technologically advantageous over a mainframe, because the cloud computing instance may be distributed, decentralized, flexible and on-demand, which allows for easier maintenance and updates when needed, especially if following a serverless model, although the mainframe can operate as the server 108 or the server 108 can operate as the mainframe in some embodiments.

The OS 108.1 may be Windows, Linux, MacOS, Android, IOS, or any other suitable OS.

The rules engine 108.2 runs on the OS 108.1. The rules engine 108.2 may be a software system (e.g., a software logic, an application program, a software module) that executes business rules in a runtime environment by business users (from computing terminals) to define, manage, and automate decision-making processes based on predefined rules. For example, the rules engine 108.2 may be a task-dedicated software logic that can be started, stopped, or paused. For example, in context of medical claim processing, the rule engine 108.2 may enable automating of evaluation and adjudication of transactions based on messages (e.g., medical claims) input thereinto based on various criteria and policies, as set over the network 102 by computing terminals operated by business users.

As mentioned above, there may be an API separate and distinct from the routing application program 106.2, external to the routing application program 106.2, although the API may be a component of the routing application program 106.2. For example, the rules engine 108.2 may host the API or the API may be separate and distinct from the rules engine 108.2, external to the rules engine 108.2. As such, the API may be hosted on the server 106, the server 108, or another server communicating with the network 102. For example, the API may be logically positioned between the routing application program 106.2 and the rules engine 108.2. For example, the API may be a REST API, a SOAP API, or another suitable API. The API may be programmed to receive a message (e.g., a medical claim) from the routing application program 106.2 and convert the message from one data format (e.g., NCPDP format, structured format, JSON format, XML format, delimited format) to another data format (e.g., structured format, JSON format, XML format, delimited format, NCPDP format) before submitting or passing the message, as converted (or a copy thereof), to the rules engine 108.2 to process the message, as converted (or a copy thereof), as disclosed herein. Likewise, the API may be programmed to receive a message (e.g., an approval or a denial of a medical claim) from the rules engine 108.2 and convert, similar to above, the message from one data format (e.g., structured format, JSON format, XML format, delimited format, NCPDP format) to another data format (e.g., NCPDP format, structured format, JSON format, XML format, delimited format) before submitting or passing the message, as converted (or a copy thereof), to the routing application program 106.2 to process the message, as converted (or a copy thereof), as disclosed herein.

The rules engine 108.2 may have (i) a rule repository (e.g., a database) programmed to store rules, (ii) a rule editor (e.g., a UI) programmed to define, modify, and organize rules using natural language or domain-specific languages as accessed from a computing terminal, (iii) a rule execution logic (e.g., a software architecture, a software module) programmed to interpret and evaluate various business rules against input data or scenarios (e.g., applying rules and generating appropriate outcomes), and (iv) an integration interface (e.g., a software architecture, a software module) programmed to communicably integrate with other computing systems (e.g., EHR software, medical claim management software), to access relevant data and share those results. For example, in context of medical claim processing, the rules engine 108.2 may be used to automate various decision-making processes based on predefined rules. For example, some of such rules may be (i) claim eligibility rules (e.g., if a patient's policy is not active or has expired, then reject this claim), (ii) medical coding rules (e.g., if a medical coding on a claim contains an invalid or inconsistent combination of codes, then flag the claim for review), (iii) benefit limit rules (e.g., if a claim requests an amount that exceeds an annual or lifetime benefit limit for a patient's policy, then reject or partially approve the claim), (iv) pre-existing condition rules (e.g., if a claim for a patient is related to a pre-existing condition and the patient is within his waiting period, then reject the claim), (v) claim adjudication rules (e.g., calculate a patient's deductible, co-pay, and coinsurance amounts based on a set of policy terms), (vi) compliance and regulatory rules (e.g., ensure that a claim adheres to relevant healthcare regulations, coding guidelines, and billing practices).

Some examples of business rules executable by the rules engine 108.2 may include business rules for authorization processes, workflow processes, messaging processes, e-payment processes, and other suitable processes. Some business rules may be based on Boolean logic and include if-then (or other suitable) statements, whether standalone, chained, branched, or otherwise. Some business rules may enable enrichment of messages (e.g., medical claims) by metadata, such as descriptive metadata, preservation metadata, structural metadata, provenance metadata, definitional metadata, administrative metadata, computational transaction metadata, or other suitable metadata. For example, in context of medical claim processing, the descriptive metadata may be information that describes contents and key attributes of medical claims data to aid in identification, organization, and discovery of medical claims within databases or repositories, such as claim identifiers, patient name, date of service, provider name, diagnosis codes, procedure codes, billing codes, and claim status. For example, in context of medical claim processing, the preservation metadata may be information that supports and documents long-term preservation and accessibility of electronic medical claims data, such as technical details about file formats, software, fixity information (e.g., checksums, digital signatures), chain of custody, data transformations, data permissioning, data migration, and systems used to create and manage medical claims data. For example, in context of medical claim processing, the structural metadata may be information that describes organization, structure, and relationships within medical claims data, such as internal structure and components of messages (e.g., medical claims), different sections or fields within data structures (e.g., documents, files), different data elements within messages (e.g., medical claims), such as linking diagnosis codes to specific procedure identifiers or service identifiers, different connections between messages (e.g., medical claims) and related documents or files, such as supporting medical records, attachments, or supplemental information, hierarchical structure of claims data, such as how individual messages (e.g., medical claims) are organized within larger claim batches or submissions, different file formats, data types, and technical specifications used to store and transmit medical claims data, different data integrations by mapping structures of claims data to standardized data models or schemas used in claims processing systems. For example, in context of medical claim processing, the provenance metadata may be information that tracks origin, history, and lineage of medical claims data by providing detailed audit trails of data sources, transformations, and processes involved in creation/handling of messages (e.g., medical claims), such as identifiers of healthcare providers, insurance companies that generated initial claims data, information about computing systems, applications, and tools used to process, transform, or transmit messages (e.g., medical claims) at various stages, sequences of actions, processes, and any modifications applied to claims data, establishing clear data lineages, identifies user profiles permissioned for creating, modifying, or approving messages (e.g., medical claims) at different points in time, various timestamps and versioning information to reconstruct the chronological history of changes to messages (e.g., medical claims). For example, in context of medical claim processing, the definitional metadata may be information that indicates meaning and semantics of data elements within messages (e.g., medical claims), such as definitions or descriptions of codes (e.g., International Classification of Diseases (ICD), Current Procedural Terminology (CPT), National Drug Code (NDC)) used in claims, explanations of terminology or abbreviations used in data fields within messages (e.g., medical claims), data dictionaries or glossaries that provide precise meaning of data elements like claim types, billing statuses, or provider specialties, details on how specific data values are calculated or derived, such as claim payment amounts based on coverage rules, mappings between coded values in claims and their textual descriptions or labels, and business rules or validation criteria that define acceptable values or formats for claims data. For example, in context of medical claim processing, the administrative metadata may be structured data elements that provide essential information about medical services rendered, patient details, provider information, and billing codes to enable accurate claims processing, reimbursement, and data analysis. The administrative metadata may include patient information (e.g., patient name, date of birth, gender, address, insurance policy number, group number, patient medical record number), provider information (e.g., provider name, National Provider Identifier (NPI), provider specialty, taxonomy codes, provider address, contact information), service details (e.g., service date(s), diagnosis codes (e.g., ICD codes) describing patient's condition, procedure codes (e.g., CPT codes) for services rendered, service location), billing information (e.g., charges for each service, modifiers for procedures, place of service codes, rendering provider information). For example, the administrative metadata can be on standardized claim forms, such as CMS-1500 or UB-04, or in EDI formats, such as X12 837. For example, in context of medical claim processing, the computational transaction metadata may be information (e.g., textual, structured, unstructured, descriptive) that provides context and details beyond a basic transaction information, such as sender, receiver, and an amount of payments indicated or stated to be transferred. This information may enhance at least some efficiency, accuracy, and automation of claim (e.g., message) processing. For example, the computational transaction metadata may include patient or provider demographics, such as a member identification number (e.g., a unique identifier for a patient), a national provider identifier (e.g., a unique identifier for a healthcare providers), a claim reference number (e.g., a unique identifier for each claim, facilitating tracking and re-association of attachments with the correct transaction. For example, the computational transaction metadata may include transaction details, such as service dates, procedure codes (e.g., standardized codes, CPT, ICD or others that describe medical procedures and diagnoses), billing information (e.g., details about various costs associated with various services provided). For example, the computational transaction metadata may include attachments and documentation, such as electronic attachments (e.g., documents, medical records, lab results, and imaging reports that support a particular claim and metadata may help in re-association of these attachments with corresponding claims) and reference numbers (e.g., link attachments to correct administrative transactions to reducing manual intervention). For example, the computational transaction metadata may include policy and authorization data, such as pre-authorization information (e.g., data regarding prior approvals for specific treatments or procedures) and policy details (e.g., information about patient's insurance coverage including limits and exclusions). For example, the computational transaction metadata may include security and compliance information, such as encryption and digital signatures or audit trails (e.g., metadata that tracks who accessed or modified a data item to ensure compliance with regulations like HIPAA). Therefore, the computational transaction metadata may improve accuracy (e.g., reducing errors in matching information), automation (e.g., providing structured data for interpretation by machine learning or other automation software), and data management (e.g., organization of large volumes of data to efficiently expedite workflow), while staying compliant with regulatory requirements, protective sensitive information and ensuring secure transactions. As such, the rules engine 108.2 may be programmed to enrich messages (e.g., medical claims) with various metadata for application via the business rules.

The database 110 may be a relational database, a graph database, a vector database, a multi-model database or another suitable database. The rules engine 108.2 is programmed to interface (e.g., read, write, delete, query, retrieve, store, search) with the database 110. The database 110 is shown to be hosted off the server 108, which may be on another server (e.g., a database server hosting a DBMS). However, note that this configuration is not required and the server 108 may host the database 110 such that the database 110 runs on the OS 108.1, which may enable the rules engine 108.2 to apply rules more efficiently (e.g., faster).

The database 110 may have a schema (e.g., flat, hierarchical, network, relational, star, snowflake) according to which the database 110 stores its records. For example, in context of medical claim processing, the database 110 may have a set of tables (e.g., related to each other by a primary key) storing data (e.g., textual, structured, unstructured, descriptive) for configurations of patient profiles (e.g., personal information, medical history), a set of tables (e.g., related to each other by a primary key) storing data (e.g., textual, structured, unstructured, descriptive) for configurations of payor profiles (e.g., policy information, policy limits), a set of tables (e.g., related to each other by a primary key) storing data (e.g., textual, structured, unstructured, descriptive) for configurations of prescription profiles (e.g., dosages, side effects), a set of tables (e.g., related to each other by a primary key) storing data (e.g., textual, structured, unstructured, descriptive) for configurations of prescriber profiles (e.g., personal information, prescription history), a set of tables (e.g., related to each other by a primary key) storing data (e.g., textual, structured, unstructured, descriptive) for configurations of product profiles (e.g., name, dosages), a set of tables (e.g., related to each other by a primary key) storing data (e.g., textual, structured, unstructured, descriptive) for configurations of pharmacy software (e.g., input parameters, processing parameters, output parameters), and a set of tables (e.g., related to each other by a primary key) storing data (e.g., textual, structured, unstructured, descriptive) for configurations of place of service profiles (e.g., a set of attributes descriptive of a physical pharmacy). At least two of these sets of tables may be related to each other (e.g., via a primary key).

The database 110 may have the schema be a relational schema enabling storage and manage of various data elements involved. For example, there may be a patient information schema involving a patient table (e.g., patient_id, name, date_of_birth, gender, address), an insurance table (e.g., insurance_id, policy_number, group_number), and a patient_insurance table (e.g., patient_id, insurance_id) to link patients to their insurance policies. For example, there may be a provider information schema involving a provider table (e.g., provider_id, name, NPI, specialty, taxonomy_code, address). For example, there may be a service details schema involving a claim table (e.g., claim_id, patient_id, provider_id, service_date, total_charges), a diagnosis table (e.g., diagnosis_id, diagnosis_code, description), a claim_diagnosis table (e.g., claim_id, diagnosis_id) to link claims to diagnoses, a procedure table (e.g., procedure_id, procedure_code, description), and a claim_procedure table (e.g., claim_id, procedure_id, charges, modifiers) to link claims to procedures. For example, there may be a billing information schema involving a payment table (e.g., payment_id, claim_id, amount_paid, date_paid), an adjustment table (e.g., adjustment_id, claim_id, adjustment_code, amount) for claim adjustments. Resultantly, such schemas enable at least partial capture of relevant metadata required for medical claim processing, such as patient demographics, insurance details, provider information, diagnosis and procedure codes, service dates, charges, payments, and adjustments. Normalization principles may be applied to avoid data redundancy and maintain data integrity.

Figure 2:
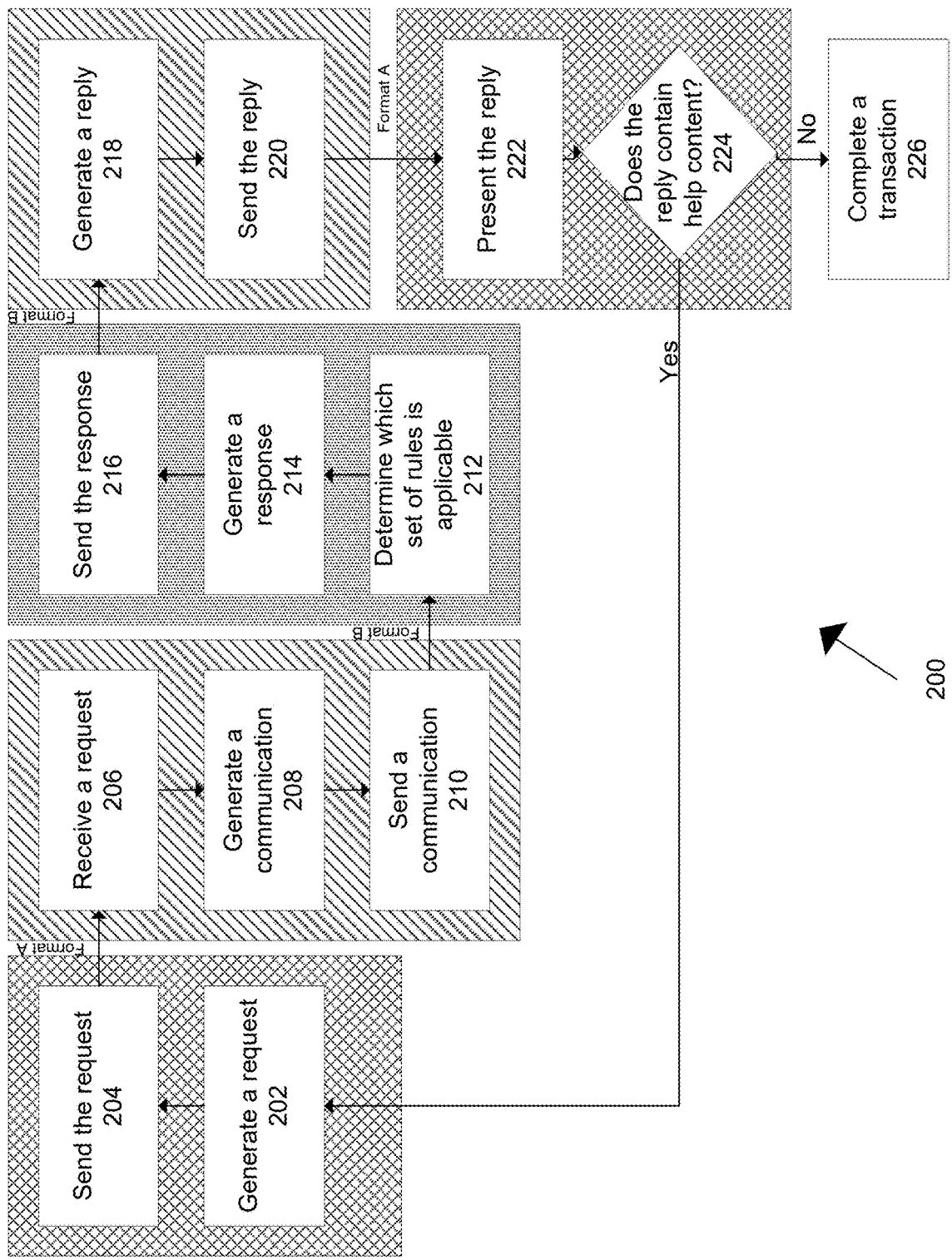
FIG. 2 shows a flowchart of a first embodiment of a method for providing guidance to end users in completing transactions using the system of FIG. 1 according to this disclosure.

FIG. 2 shows a flowchart of a first embodiment of a method for providing guidance to end users in completing transactions using the system of FIG. 1 according to this disclosure. In particular, there is a process 200 having a set of blocks 202-226 performed by the system 100. Note that the blocks 202-226 are shown over hatched blocks corresponding to actors (e.g., hardware, software) performing or capable of performing those actions in view of FIG. 1.

In block 202, the end user application program 104.2 generates a first request (e.g., a message containing an alphanumeric content expressing a medical claim) associated with a profile (e.g., a patient profile). The first request may be generated based on an input (e.g., a physical or virtual keyboard, a microphone, a camera) from a user (e.g., a pharmacist or a pharmacy technician) operating the end user application program 104.2 in a locale (e.g., a room, a building, a pharmacy, a hospital) or received from a data source (e.g., an API, an FTP site) over the network 102. For example, when the end user application program 104.2 is the browser application program, then the browser application program may be logged into a web-based pharmacy application program over the network 102 to generate the first request, where the web-based pharmacy application program is hosted in a server remote from the computing terminal 104, the server, 106, the server 108, and the database 110. For example, when the end user application program 104.2 is the pharmacy application program, then the pharmacy application program generates the first request. The first request may have various data (e.g., alphanumeric contents), such as patient data, medication data, dosage data, insurance data, or other suitable data, according to what is described in context of FIG. 1. For example, the first request may be formatted in a data format, such as a flat data file, an NCPDP format, a matrix format, or another suitable format.

In block 204, the end user application program 104.2 sends the first request (or a copy thereof) to the routing application program 106.2 over the network 102 from the computing terminal 104 to the server 106. Before such sending, the end user application program 104.2 may convert or format the first request in a data format, such as a flat data file, an NCPDP format, a matrix format, or another suitable format.

In block 206, the routing application program 106.2 receives the first request (or a copy thereof) from the end user application program 104.2 over the network 102 from the computing terminal 104 at the server 106. The first request may be received formatted in a data format, such as a flat data file, an NCPDP format, a matrix format, or another suitable format.

In block 208, the routing application program 106.2 generates a first communication (e.g., a message) based on the first request. Such generation may contain information sourced (e.g. copied) from the first request and involve the routing application program 106.2 determining where to route the first communication over the network 102 based on information sourced from the first request, according to what is described in context of FIG. 1. Further, such generation may sometimes involve converting or formatting the first communication in a data format different from how the first request is formatted when received from the end user application program 104.2. For example, such conversion or formatting may be into a delimited format, a hierarchical format, a tree format, a graph format, a CSV format, a JSON format, an XML format, or another suitable format. For example, if the first request was received formatted in a data format, such as a flat data file, a NCPDP format, a matrix format, or another suitable format, then the first communication may be converted to be formatted in a delimited format, a hierarchical format, a tree format, a graph format, a CSV format, a JSON format, an XML format, or another suitable format.

In block 210, the routing application program 106.2 sends the first communication (or a copy thereof) to the rules engine 108.2 over the network 102 from the server 106 to the server 108. Before such sending, the routing application program 106.2 or an API, as mentioned above, may or may not convert the first communication from its format (e.g., NCPDP) or convert the first communication into another format (e.g., structured) if needed.

In block 212, the rules engine 108.2 contains a first set of business rules, which may be set by a computing terminal (e.g., a desktop computer, a laptop computer), and a second set of business rules, which may be set by a computing terminal (e.g., a desktop computer, a laptop computer), according to what is described in context of FIG. 1. For example, the first set of business rules may be associated with or grant an approval of a transaction based on or involving the first request, whereas the second set of business rules may associated with or issue a denial of the transaction based on or involving the first request. For example, the rules engine 108.2 may be programed for business rules to be forward-chaining (e.g., processing condition-action rules) or reactive (e.g., detecting and reacting to events and patterns). As such, the rules engine 108.2 receives the first communication (or a copy thereof) and determines whether either the first set of rules or the second set of rules is applicable to the first communication, but not both. For example, the rules engine 108.2 may receive the first communication (or a copy thereof) from the routing application program 106.2 through an API, as mentioned above. As such, the rules engine 108.2 may receive the first communication (or a copy thereof) converted by the API from one data format (e.g., NDPDP format) to another data format (e.g., structured format). The rules engine 108.2. may determine whether either the first set of rules or the second set of rules is applicable to the first communication, but not both, based on sourcing (e.g., copying) information (e.g. alphanumeric content in fields) from the first communication and attempting to apply such information to the first set of business rules or the second set of business rules, or vice versa. If such information is applicable to the first set of business rules, then for efficiency purposes, such information is not attempted to be applied to the second set of business rules, or vice versa.

Note that during or to enable the rules engine 108.2 to determine whether either the first set of rules or the second set of rules is applicable to the first communication, but not both, the rules engine 108.2 may access various metadata, as described in context of FIG. 1, to enrich (e.g., augment, supplement) the first communication and then query the database 110, if needed, for more relevant or additional information to determine whether the first set of rules or the second set of rules is applicable to the first communication, but not both. One example of this is disclosed in context of FIG. 5. Likewise, if such information is applicable to the first set of business rules, then for efficiency purposes, the rules engine 108.2 avoids querying the database 110, or vice versa.

In block 214, the rules engine 108.2 generates either a first response (e.g., a message) based on the first set of business rules being determined by the rules engine 108.2 to be applicable or a second response (e.g., a message) based on the second set of business rules being determined by the rules engine 108.2 to be applicable. The first response contains a first binary content (e.g., approved, true) responsive to the first communication based on the first set of rules being determined by the rules engine 108.2 to be applicable to the first communication. The second response contains a second binary content (e.g., denied, false) and a first help (e.g., text, images) content responsive to the first communication, where the second binary content is opposite the first binary content and the first help content is generated by the rules engine 108.2 based on the second set of rules being applicable to the first communication. As such, if the first binary content indicates an approval of a transaction originating based on the first request sourced from the end user application program 104.2 running on the computing terminal 104, then the first response will indicate so. However, if the second binary content indicates a denial of the transaction originating based on the first request sourced from the end user application program 104.2 running on the computing terminal 104, then the first help content hint or indicate why the denial was made (e.g., what business rule was triggered, missing information, incorrect information) or what information or action can remedy the denial (e.g., provide information on X, correct information Y). For example, this information or action can help the end user application program 104.2 to get the transaction approved. The first help content may be or operate as a wizard to guide the user of the end user application program 104.2 to get the first request ultimately approved. Note that such generation may involve converting or formatting the first response or the second response in a data format similar or same to how the first communication is formatted when the rules engine 108.2 received the first communication. For example, such data format may be a delimited format, a hierarchical format, a tree format, a graph format, a CSV format, a JSON format, an XML format, or another suitable format.

In block 216, the rules engine 108.2. sends either the first response (or a copy thereof) or the second response (or a copy thereof) to the routing application program 106.2 over the network 102 from the server 108 to the server 106. For example, the rules engine 108.2 may send the first response (or a copy thereof) or the second response (or a copy thereof) to the routing application program 106.2 through an API, as mentioned above.

In block 218, the routing application program 106.2 (a) receives either the first response (or a copy thereof) or the second response (or a copy thereof) from the rules engine 108.2 over the network 102 from the server 108 to the server 106. For example, the routing application program 106.2 may receive the first response (or a copy thereof) from the rules engine 108.2 through an API, as mentioned above. As such, the routing application program 106.2 may receive the first response (or a copy thereof) converted by the API from one data format (e.g., structured format) to another data format (e.g., NCPDP format). As such, the routing application program 106.2 generates either (1) a first reply (e.g., a message) to the first request based on information (e.g., text, images) sourced (e.g., copied) from the first response, where the first reply contains the first binary content, or (2) a second reply (e.g., a message) to the first request based on information (e.g., text, images, a Uniform Resource Locator (URL), a tokenized URL) sourced (e.g., copied) from the second response, where the second reply contains the second binary content and the first help content. Further, such generation may involve converting or formatting the first reply or the second reply in a data format similar or same to how the first request is formatted when the routing application program 106.2 received the first request. For example, such data format may be a flat data file, an NCPDP format, a matrix format, or another suitable format.

In block 220, the routing application program 106.2 sends either the first reply (or a copy thereof) or the second reply (or a copy thereof) to the end user application program 104.2 over the network 102 from the server 106 to the computing terminal 104. Before such sending, the routing application program 106.2 may convert or format the first reply or the second reply in a data format similar or same to how the first request is formatted when the routing application program 106.2 received the first request. For example, such data format may be a flat data file, an NCPDP format, a matrix format, or another suitable format.

In block 222, the end user application program 104.2 (a) receives either the first reply (or a copy thereof) or the second reply (or a copy thereof) from the routing application program 106.2 over the network 102 from the server 106 to the computing terminal 104. As such, the end user application program 104.2 displays (e.g., on a screen, a touchscreen, a wearable screen) either (1) a first message (e.g., text, image) containing the first binary content sourced (e.g., copied) from the first reply or (2) a second message (e.g., text, image) containing the second binary content and the first help content sourced (e.g., copied) from the second reply. Therefore, if the first message is displayed, then the transaction originating based on the first request sourced from the end user application program 104.2 running on the computing terminal 104 is indicated to be approved, thereby completing the transaction. However, if the second message is displayed, then the transaction originating based on the first request sourced from the end user application program 104.2 running on the computing terminal 104 is indicated to be denied, thereby not completing the transaction. As such, to help, aid, enable, facilitate, or guide the user to complete the transaction originating based on the first request sourced from the end user application program 104.2 running on the computing terminal 104, the second message contains the first help content informing the user in helping, aiding, enabling, facilitating, or guiding the user in what information is needed (e.g., provide information on X) or steps to take (e.g., correct information Y, complete this form, click this hyperlink, access this URL, call this number, scan a copy of a physical prescription) to the complete the transaction originating based on the first request sourced from the end user application program 104.2 running on the computing terminal 104.

In block 224, the end user application program 104.2 determines whether any help content is received in or displayed by the first reply or the second reply (e.g., by a data field dedicated to storage of help content having or lacking data or certain type of data). If yes, then block 202 is performed again, but now using the first help to complete the transaction originating based on the first request sourced from the end user application program 104.2 running on the computing terminal 104. If no, then block 226 is performed. For example, when the block 202 need not to be performed again, from the block 202 to the block 226, there may be about 5 seconds or less (e.g., about 4 seconds, 3 seconds, 2 seconds, or 1 second), i.e., the transaction may be approved in about 5 seconds or less.

If block 202 needs to be performed again, then blocks 202-224 may be similarly repeated or iterated, as explained above. This repetition or iteration enables the rules engine 108.2 to allow (i) expressing complex logic (e.g., to enable the first help content to be generated based on various business rules), (ii) handling time/event synchronization (e.g., to enable efficient transaction processing), (iii) providing insights into rule execution (e.g., what information or action is needed to complete the transaction), and (iv) modeling uncertainties (e.g., how to get the transaction completed). However, at this point in performance of the process 200 by the system 100, the end user application program 104.2 generates a second request associated with the profile and the first request. Therefore, the second request now contains information (e.g., text, images), as input by the user into the user application program 104.2 or caused by the user to be retrieved by the user application program 104.2 from a data source (e.g., a server, an API, an FTP site) remote from the computing terminal 104, based on the first help, sufficient to get the transaction, as now formed by at least the first request and the second request, to be approved by the rules engine 108.2.

As such, similar to the blocks 202-224, the end user application program 104.2 may generate the second request associated with the profile and the first request based on the first request, the second binary content, and the first help content. Whether the second request is a new request or the first request as amended or supplemented with information (e.g., text, images) based on the first help content, the second request is still associated with the profile and the first request (same transaction), but now amended or supplemented with information to remedy whatever was deficient as determined by the rules engine 108.2 when generating the second binary content. Therefore, pursuant to the block 202 explained above, the second request may be generated based on the input from the user operating the end user application program 104.2 according to the first help content guiding the user in what information is needed (e.g., provide information on X) or steps to take (e.g., correct information Y, complete this form, click this hyperlink, access this URL, call this number, scan a copy of a physical prescription) to complete the transaction originating based on the first request sourced from the end user application program 104.2 running on the computing terminal 104. For example, the second request augments or supplements the first request based on the first help content. For example, the first request or the second request may be each formatted in a first format (e.g., a flat file, a NCPDP format, a matrix format). For example, the first request or the second request may each be formatted as a data file containing a set of segments where the set of segments contains a set of fields where each field in the set of fields contains a single data element where the set of fields and the set of segments are separated by a set of alphanumeric characters. For example, the data file may be compliant with a NCPDP format. Then, pursuant to the block 204 explained above, the end user application 104.2 submits the second request (or a copy thereof) to the routing application program 106.2. Then, pursuant to the block 206 explained above, the routing application program 106.2 receives the second request (or a copy thereof). Then, pursuant to the block 208 explained above, the routing application program 106.2 generates a second communication (e.g., a message) based on the second request, which may or may not include conversion or formatting between data formats, as described above. For example, the first communication or the second communication may each be formatted in a second format (e.g., a delimited format, a JSON format, a CSV format, an XML format). Then, pursuant to the block 210 explained above, the routing application program 106.2 sends the second communication (or a copy thereof) to the rules engine 108.2, which may or may not include conversion or formatting between data formats, as described above. Then, pursuant to the block 212 explained above, the rules engine 108.2 (a) receives the second communication (or a copy thereof) and (b) determines whether either the first set of rules or the second set of rules is applicable to the second communication, but not both. For example, the rules engine 108.2. may receive the second communication (or a copy thereof) through an API, as mentioned above, which may convert the second communication (or a copy thereof) from one data format (e.g., NCPDP format) and another data format (e.g., structured format). Then, pursuant to block 214 explained above, the rules engine 108.2 generates either a third response based on the first set of rules being applicable to the second communication or a fourth response based on the second set of rules being applicable to the second communication. The third response (e.g., a message) has a third binary content (e.g., approved, true) responsive to the second communication based on the first set of rules being applicable to the second communication. The fourth response (e.g., a message) has a fourth binary content (e.g., denied, false) and a second help content (e.g., text, images) responsive to the second communication, where the fourth binary content is opposite the third binary content and the second help content is generated by the rules engine 108.2 based on the second set of rules being applicable to the second communication, which may include conversion or formatting between data formats, as described above. For example, the first response or the second response may each be formatted in a first data format (e.g., a structured format, a delimited format, a JSON format, a CSV format, an XML format). As such, if the third binary content indicates the approval of the transaction originating based on the first request sourced from the end user application program 104.2 running on the computing terminal 104, then the third response will indicate so. For example, the first binary content or the third binary content may each indicate the approval of the transaction associated with the profile. However, if the fourth binary content indicates the denial of the transaction originating based on the first request sourced from the end user application program 104.2 running on the computing terminal 104, then the second help content may hint or indicate why the denial was again made (e.g., what business rule was triggered, missing information, incorrect information) or what information or action can remedy the denial (e.g., provide information on X, correct information Y). For example, this information or action can help the end user application program 104.2 to get the transaction approved. For example, since the transaction is initiated based on the first request, the second binary content or the fourth binary content may each indicate the denial of the transaction. The second help content may be or operate as a wizard to guide the user of the end user application program 104.2 to get the first request ultimately approved. There may be a situation when the rules engine 108.2 receives the first communication at a first point in time (e.g., 9:00 am ET on Jan. 1, 2025) and the second communication at a second point in time (e.g., 9:01 am ET on Jan. 2, 2025), which may be too close to each other in terms of time, thereby indicating the second communication may be spam or fraudulent. As such, to minimize spam or fraud, the second set of rules may have a rule mandating a passage of a predetermined time interval (e.g., 5 minutes, 30 minutes, 1 hour, 4 hours, 12 hours, 24 hours, 48 hours, 7 days) between the first point in time and the second point time to enable (e.g., permit, permission, authorize, allow, semaphore) the rule engine 108.2 to generate the third response. The predetermined time interval may set by a computing terminal (e.g., operated via a superuser or administrator account) other than the computing terminal 104 and communicating with the network 102 similar to the computing terminal 104. Then, pursuant to the block 216 explained above, the rules engine 108.2 sends either the third response (or a copy thereof) or the fourth response (or a copy thereof) to the routing application program 106.2, which may or may not include conversion or formatting between data formats, as described above. For example, the rules engine 108.2. may send the third response (or a copy thereof) or a fourth response (or a copy thereof) through an API, as mentioned above, which may convert the third response (or a copy thereof) or the fourth response (or a copy thereof) from one data format (e.g., structured format) and another data format (e.g., NCPDP format). Then, pursuant to the block 218 explained above, the routing application program 106.2 receives the third response (or a copy thereof) or the fourth response (or a copy thereof) from the rules engine 108.2 and generates either (1) a third reply to the second request based on the third response where the third reply contains the third binary content or (2) a fourth reply to the second request based on the fourth response where the fourth reply contains the fourth binary content and the second help content, which may include conversion or formatting between data formats, as described above. For example, the first reply or the second reply may each be formatted in a second data format (e.g., a flat file format, a NCPDP format, a matrix format). Then, pursuant to the block 220 explained above, the routing application program 106.2 sends either the third reply (or a copy thereof) or the fourth reply (or a copy thereof) to the end user application program 104.2. Then, pursuant to the block 222, the end user application program 104.2 (a) receives either the third reply (or a copy thereof) or the fourth reply (or a copy thereof) from the routing application program 106.2 and (b) displays either (1) a third message containing the third binary content sourced (e.g., copied) from the third reply or (b) a fourth message containing the fourth binary content and the second help content sourced (e.g., copied) from the fourth reply. Then, pursuant to the block 224, the end user application program 104.2 determines whether any help content is received in or displayed by the third reply or the fourth reply (e.g., by a data field dedicated to storage of help content having or lacking data or certain type of data). If yes, then block 202 is performed again, but now using the second help to complete the transaction originating based on the first request sourced from the end user application program 104.2 running on the computing terminal 104. If no, then block 226 is performed. This repetition or iteration continues until a predetermined threshold of repetitions or iterations is reached. For example, the predetermined threshold may be five repetitions or iterations. Once the predetermined threshold has been reached and the transaction is still not complete, the end user application program 104.2 may present an error menu, which may inform the user to contact a support person to get further help.

In block 226, the transaction is determined to be completed by the end user application program 104.2, the routing application program 106.2, or the rules engine 108.2. As such, another transaction for a same or another profile can be requested, which may occur via performance of the block 202 again to start the process 200 again.

Although the first reply, the second reply, the third reply, or the fourth reply does not contain a tokenized Uniform Resource Locator (URL), this configuration is not required. As such, the first reply, the second reply, the third reply, or the fourth reply may contain a tokenized URL unique to the first request or the second request, which may be for purposes of the transaction, as being attempted to be completed based on the first request or the second request, or as completed. For example, the first reply, the second reply, the third reply, or the fourth reply may be formatted in a NCPDP format and have an Additional Message Information (AMI) field (e.g., 526-FQ field) containing the tokenized URL. For example, the system 100 may comprise (a) the computing terminal 104 hosting a first application program 104.2 (e.g., a pharmacy management application program) and a second application program 104.2 (e.g., a browser application program), (b) the server 108 hosting the rules engine 108.2, (c) a web server communicating with the network 102, (d) an API, and (e) the routing application program 106.2. The routing application program 106.2 may be programmed to send a request associated with a profile to the rules engine 108.2 through the API after the routing application program 106.2 receives the request from the first application program 104.2 such that (i) the rules engine 108.2 generates a response to the request where the response contains a field populated with a tokenized URL unique to the request, (ii) the rules engine 108.2 sends the response through the API to the routing application program 106.2, and (iii) the routing application program 106.2 sends the response to the first application program 104.2 such that the tokenized URL is activatable at the first application program 104.2 to be opened by the second application program 104.2 without any other login credentials to the rules engine (e.g., one-time event) to cause the rules engine 108.2 to retrieve a set of data specific (e.g., customized) to the request and enable the web server to serve a web page generated based on the set of data to the second application program 104.2 such that the web page is displayed by the second application program 104.2. The API is programmed to convert the request between a NCPDP (or another suitable) format and a structured (or another suitable) format when the request is sent from the routing application program 106.2 to the rules engine 108.2 through the API and the response is sent from the rules engine 108.2 to the routing application program 106.2 through the API. The API is programmed to receive the request from the routing application program 106.2 in the NCPDP format. The rules engine 108.2 is programmed to receive the request from the API in the structured format. The API is programmed to receive the response from the rules engine 108.2 in the structured format. The routing application program 106.2 is programmed to receive the response from the API in the NCPDP format.

For example, when the tokenized URL is included in the first reply, the second reply, the third reply, or the fourth reply, the tokenized URL is activatable (e.g., clickable) at the end user application program 104.2 to present a web form (e.g., a web page, a questionnaire, a reflexive questionnaire, a summary of transaction, a status of the transaction) within the end user application program 104.2 over the network 102. The web form may be associated with the profile based on the first request or the second request and completable from within the end user application program 104.2 over the network 102, if needed based on the first help content, the second help content, or more if needed. If the end user application program 104.2 is secured to avoid presenting URLs or activating URLs (e.g., a pharmacy application program) over the network 102, then the computing terminal 104 may host another end user application program, similar to the end user application program 104.2, where the tokenized URL is activatable (e.g., clickable) at the end user application program 104.2 to present a web form (e.g., a web page, a questionnaire, a reflexive questionnaire, a summary of transaction) within the other end user application program over the network 102 such that the web form is associated with the profile based on the first request or the second request and completable from within the other end user application program over the network 102. Similarly, if the end user application program 104.2 is secured to avoid presenting URLs or activating URLs (e.g., a pharmacy application program) over the network 102, then the system 100 may include another computing terminal, similar to the computing terminal 104, whether physically collocated (e.g., same room, same building) or not collocated therewith, hosting another end user application program, similar to the end user application program 104.2, where the tokenized URL is activatable (e.g., clickable) at the end user application program 104.2 to present a web form (e.g., a web page, a questionnaire, a reflexive questionnaire, a summary of transaction, a status of the transaction) over the network 102 within the other end user application program running on the other computing terminal such that the web form is associated with the profile based on the first request or the second request and completable from within the other end user application program running on the other computing terminal over the network 102. In these scenarios, the end user application program 104.2 and the other end user application program may communicate with each other (e.g., by messaging, synchronized messaging, asynchronous messaging, pushing messages, pulling messages) over the network 102 to allow for such "handover" or "takeover," if required to do so by security settings of the end user application program 104.2 or if transactions are structured such that more information may be needed from another modality of data entry, such as the other computing terminal or the end user application program, whether physically collocated (e.g., same room, same building) or not collocated therewith.

Figure 3:
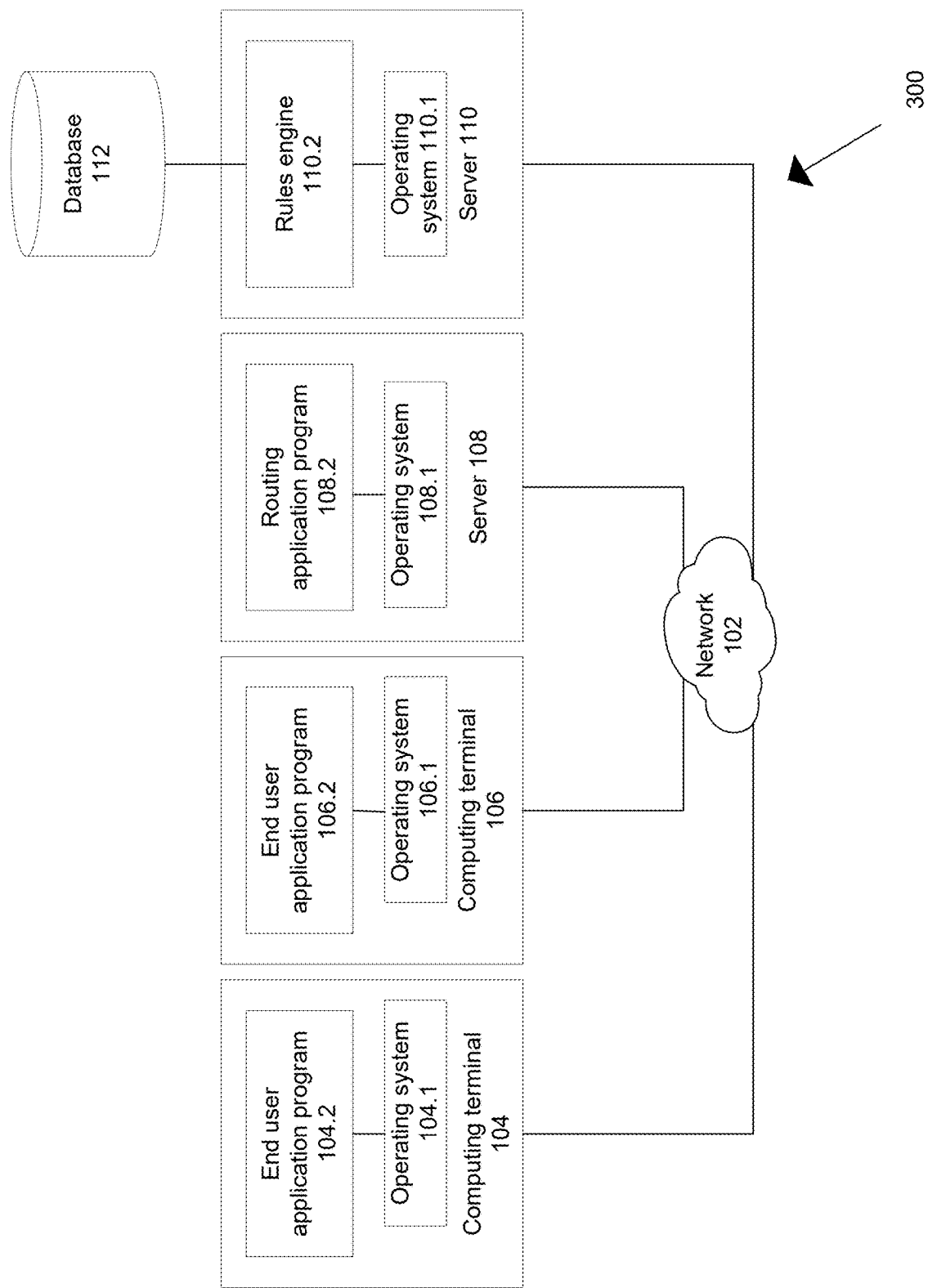
FIG. 3 shows a diagram of a second embodiment of the system for providing guidance to end users in completing transactions according to this disclosure.

FIG. 3 shows a diagram of a second embodiment of the system for providing guidance to end users in completing transactions according to this disclosure. In particular, there is a system 300, which is similar to the system 100. However, the system 300 differs from the system 100 in that the system 300 has two computing terminals, which enable transactions to be completed, as disclosed herein. These computing terminals are 104 and 106, respectively, hosting an OS 104.1 and an OS 106.1 and an end user application program 104.2 running on the OS 104.1 and an end user application program 106.2 running on the OS 106.1. The network 102 of the system 300 can be embodied as the network 102 of the system 100. The computing terminals 104 and 106 of the system 300 each can be embodied as the computing terminal 104 of the system 100. The OSs 104.1 and 106.1 in the system 300 each can be embodied as the OS 104.1 in the system 100. The end user application programs 104.2 and 106.2 in the system 300 can each be embodied as the end user application program 104.1 in the system 100. The server 108 of the system 300 can be embodied as the server 106 of the system 100. The OS 108 of the system 300 can be embodied as the OS 106 in the system 100. The routing application program 108.2 of the system 300 can be embodied as the routing application program 106.2 of the system 100. The server 110 of the system 300 can be embodied as the server 108 of the system 100. For example, the server 110, whether physical or virtual, may be a component of a cloud computing instance, which, in some embodiments, may be technologically advantageous over a mainframe, because the cloud computing instance may be distributed, decentralized, flexible and on-demand, which allows for easier maintenance and updates when needed, especially if following a serverless model, although the mainframe can operate as the 110 server or the server 110 can operate as the mainframe in some embodiments. The OS 110.1 of the system 300 can be embodied as the OS 108.1 of the system 100. The rules engine 110.2 of the system 300 can be embodied as the rules engine 108.2 of the system 100. The database 112 of the system 300 can be embodied as the database 110. As explained in context of FIGS. 1-2, there may be an API logically positioned between the routing application program 108.2 and the rules engine 110.2, whether external to the rules engine 110.2 or internal to the rules engine 110.2, which similarly allows for conversion between one data format (e.g., NCPDP format, structured format) and another data format (e.g., structured format, NCPDP format). For example, when data (e.g., a communication) flows from the routing application program 108.2 to the rules engine 110.2, the API may receive the data (or a copy thereof) from the routing application program 108.2 in one data format (e.g., NCPDP format), convert the data to another data format (e.g., structured format, JSON format), and send (e.g., submit, pass) the data (or a copy thereof), as converted, to the rules engine 110.2 for processing, as disclosed herein. Likewise, when data (e.g., a response) flows from the rules engine 110.2 to the routing application program 108.2, the API may receive the data (or a copy thereof) from the rules engine 110.2 in one data format (e.g., structure format, JSON format), convert the data to another data format (e.g., NCPDP format), and send (e.g., submit, pass) the data (or a copy thereof), as converted to the routing application program 108.2. for processing, as disclosed herein.

The end user application program 104.2 and the end user application program 106.2 may communicate with each other (e.g., by messaging, synchronized messaging, asynchronized messaging, pushing messages, pulling messages) over the network 102 to allow for "handover" or "takeover" of transactions being completed, if required to do so by security settings of the end user application program 104.2 or if transactions are structured such that that more information may be needed from another modality of data entry, such as the computing terminal 106 or the end user application program 106.2, whether physically collocated (e.g., same room, same building) or not collocated therewith. The computing terminal 104 and the computing terminal 106 may be physically collocated within a defined physical area (e.g., a room, a building, a pharmacy, a hospital) or may not be physically collocated within a defined physical area (e.g., one computing terminal is located in Illinois and one computing terminal is located in New Jersey). For example, the computing terminal 104 or the second computing terminal 106 may be a POS computing terminal. For example, the computing terminal 104 or the computing terminal 106 may be a computing workstation that is freestanding, stationary, or standalone on a surface, such as a shelf, a tabletop, a floor, a carpet, a tile, or another suitable surface. For example, the computing workstation may be a desktop PC tower, a microtower, a slim form factor, an AIO desktop PC, a mini PC, a SFF, an Ultra SFF, a Nettop, an ultra-compact, a mini PC, a PC-on-a-Stick, or another suitable form factor. For example, the computing workstation may avoid itself having a display, but is connected (e.g., wired, wireless, waveguide) to a computer monitor, a keyboard, a cursor control device (e.g., a mouse, a touchpad), a printer, or another suitable computing peripheral. For example, the computing workstation may be a kiosk. For example, the computing workstation may be powered from a mains electrical socket.

Figure 4A:
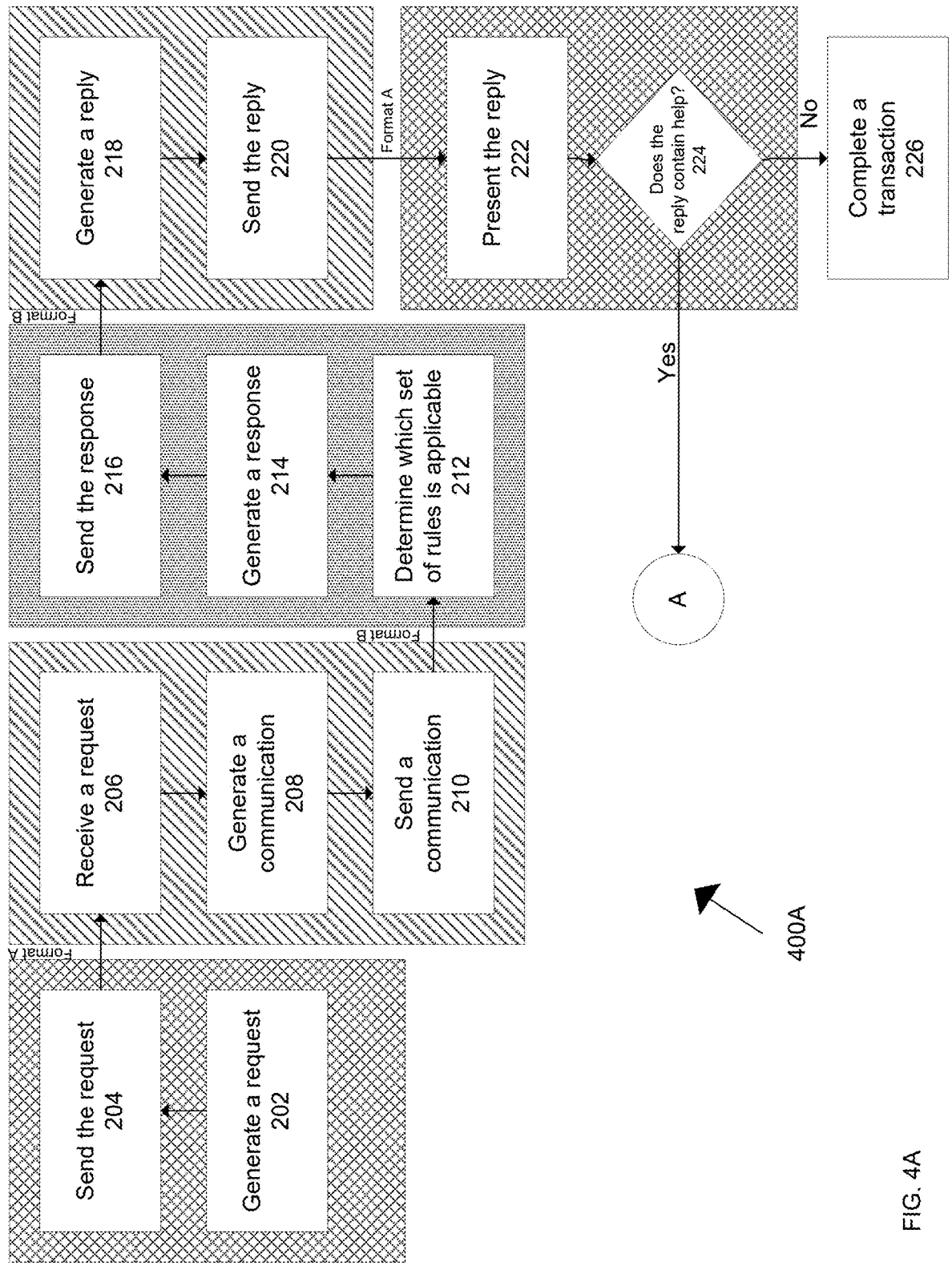
FIGS. 4A and 4B collectively show a flowchart of a second embodiment of the method for providing guidance to end users in completing transactions using the system of FIG. 3 according to this disclosure.
Figure 4B:

FIGS. 4A and 4B collectively show a flowchart of a second embodiment of the method for providing guidance to end users in completing transactions using the system of FIG. 3 according to this disclosure. In particular, there are a process 400A shown in FIG. 4A and a process 400B shown in FIG. 4B. The process 400A is performed via the system 300 involving the computing terminal 104 and the process 400B is performed via the system 300 involving the computing terminal 106. The process 400A includes a set of blocks 202-226 similar to the process 200 before repetition or iteration of the process 200 is performed, whereas the process 400B includes a set of blocks 202-226 similar to the process 200 after repetition or iteration of the process 200 is performed. Therefore, the first computing terminal 104 hosts the end user application program 104.2, the computing terminal 106 hosts the end user application program 106.2, the server 108 hosts the routing application program 108.2, and the server 110 hosts the rules engine 110.2. The rules engine 110.2 contains the first set of rules and the second set of rules, as disclosed herein. Note that the blocks 202-226 are shown over hatched blocks corresponding to actors (e.g., hardware, software) performing those actions in view of FIG. 3.

In block 202 of the process 400A, the end user application program 104.2 generates the first request associated with the profile, similar to the block 202 in the process 200.

In block 204 of the process 400A, the end user application program 104.2 sends the first request (or a copy thereof) to the routing application program 108.2 similar to the block 204 in the process 200.

In block 206 of the process 400A, the routing application program 108.2 receives the first request (or a copy thereof) from the end user application program 104.2 similar to the block 206 in the process 200.

In block 208 of the process 400A, the routing application program 108.2 generates the first communication based on the first request similar to the block 208 in the process 200.

In block 210 of the process 400A, the routing application program 106.2 sends (or a copy thereof) the first communication to the rules engine 110.2 similar to the block 210 in the process 200.

In block 212 of the process 400A, the rules engine 110.2 receives the first communication (or a copy thereof) and determines whether either the first set of rules or the second set of rules is applicable to the first communication similar to the block 212 in the process 200. One example of such determination may occur based on what is disclosed in context of FIG. 5.

In block 214 of the process 400A, the rules engine 110.2 generates either the first response or the second response, but not both similar to the block 214 in the process 200. The first response has the first binary content responsive to the first communication based on the first set of rules being applicable to the first communication similar to the block 214 in the process 200. The second response has the second binary content and the first help content responsive to the first communication where the second binary content is opposite the first binary content and the first help content is generated based on the second set of rules being applicable to the first communication similar to the block 214 in the process 200.

In block 216 of the process 400A, the rules engine 110.2 sends either the first response (or a copy thereof) or the second response (or a copy thereof) to the routing application program 108.2 similar to the block 216 of the process 200.

In block 218 of the process 400A, the routing application program 108.2 receives either the first response (or a copy thereof) or the second response (or a copy thereof) and generates either the first reply to the first request based on the first response where the first reply contains the first binary content or the second reply to the first request based on the second response where the second reply contains the second binary content and the first help content similar to the block 218 of the process 200.

In block 220 of the process 400A, the routing application program 108.2 sends either the first reply (or a copy thereof) or the second reply (or a copy thereof) to the end user application program 104.2 similar to the block 220 of the process 200.

In block 222 of the process 400A, the end user application program 104.2 receives either the first reply (or a copy thereof) or the second reply (or a copy thereof) and displays either the first message containing the first binary content sourced from the first reply or the second message containing the second binary content and the first help content sourced from the second reply similar to the block 222 of the process 200.

In block 224 of the process 400A, the end user application program 104.2 determines whether any help content is received in or displayed by the first reply or the second reply (e.g., by a data field dedicated to storage of help content having or lacking data or certain type of data). If yes, then block A is performed, but now using the first help to complete the transaction originating based on the first request sourced from the end user application program 104.2 running on the computing terminal 104. If no, then block 226 of the process 400A is performed. This "handover" or "takeover" enables the rules engine 110.2 to allow (i) expressing complex logic (e.g., to enable the first help content to be generated based on various business rules), (ii) handling time/event synchronization (e.g., to enable efficient transaction processing), (iii) providing insights into rule execution (e.g., what information or action is needed to complete the transaction), and (iv) modeling uncertainties (e.g., how to get the transaction completed).

Block A leads to the process 400B.

In block 226 of the process 400A, the transaction is determined to be completed by the end user application program 104.2, the routing application program 108.2, or the rules engine 110.2. For example, when the block 202 of the process 400A need not to be performed again, from the block 202 of the process 400A to the block 226 of the process 400A, there may be about 5 seconds or less (e.g., about 4 seconds, 3 seconds, 2 seconds, or 1 second), i.e., the transaction may be approved in about 5 seconds or less. As such, another transaction for a same or another profile can be requested, which may occur via performance of the block 202 of the process 400A again to start the process 400A again.

In block 202 of the process 400B, the end user application program 106.2 generates the second request associated with the profile based on the first request, the second binary content, and the first help content similar to the block 202 of the process 200, on repetition or iteration. The second request augments or supplements the first request based on the first help content, as explained above. The end user application program 106.2 may generate the second request based on communicating with the end user application program 104.2, as explained above. For example, the end user application program 106.2 may generate the second request based on receiving the second binary content (or a copy thereof) or the first help content (or a copy thereof) from the end user application program 104.2 over the network 102. For example, the end user application program 106.2 may generate the second request based on the end user application program 106.2 receiving an end user input (e.g., via a physical or virtual keyboard, a cursor control unit) (or a copy thereof) associated with the second binary content or the first help content from the end user application program 104.2 over the network 102. For example, the end user input may include an instruction to "handover" or "takeover" the transaction. For example, the end user application program 104.2 may be operated by a first user (e.g., a pharmacist or a pharmacy technician in a first pharmacy), and the end user application program 106.2 may be operated by a second user (e.g., a pharmacist or a pharmacy technician in a second pharmacy), where the end user input may involve a call (e.g., a landline call, a mobile call, a satellite call, an Over-The-Top (OTT) call) between the first user and the second user, where the call may be over a predetermined duration of time (e.g., 1 minute or more).

The first request or the second request may be formatted as a data file containing a set of segments where the set of segments contains a set of fields where each field in the set of fields contains a single data element where the set of fields and the set of segments are separated by a set of alphanumeric characters. For example, the data file may be compliant with a NCPDP format.

The first help content may have (e.g., contain, cause or enable to be presented) an instruction (e.g., an indication, a guide, a software wizard, a prompt, a message, an image, a text, a sound, a diagram, a popup, a hover over, a tooltip) to the first end user to operate a user interface (e.g., a graphical user interface) of the end user application program 104.1 to forward (e.g., send) the request to the end user application program 106.2 based on at least one rule of the second set of rules being applicable to the first communication. For example, when the system 300 involves management (e.g., dispensation, distribution, handling, provision, supplying) of physical objects (e.g., medications, medical devices) and the first end user operating the end user application program 104.1 is unable to manage a respective physical object as requested via the first request or the second request, then the instruction may instruct the first end user to operate the end user application program 104.1 to forward the request to the end user application program 106.2 operated by the second end user who can manage the respective physical object based on a set of information (e.g., a set of inventory information) available to the end user application program 104.2 to enable the end user application program 104.2 determine that the request should be forwarded to the end user application program 106.2 (e.g., more efficient or more optimal), where the computing terminal 104 and the computing terminal 106 are not physically collocated within a defined physical area (e.g., a room, a building, a pharmacy, a hospital, a doctor's office). For example, the computing terminal 104 may be physically positioned at a first pharmacy located at a first locale (e.g., a neighborhood, a town, a city, a state) and the computing terminal 106 may be physically positioned at a second pharmacy located at a second locale (e.g., a neighborhood, a town, a city, a state) spaced apart (e.g., a 0.5 miles, 1 mile, 5 miles, 10 miles) from the second locale. This forwarding may be technologically advantageous for various reasons.

For example, this at least one rule of the second set of rules may be a mapping (e.g., a hash table) between a first entity identifier (e.g., a name, a physical or logical address) associated with the computing terminal 106, which may include its locale information, and a second entity identifier (e.g., (e.g., a name, a physical or logical address, a doctor identifier, a payer identifier, a patient identifier, a pharmacy network identifier), which may include its locale information, such that the end user application program 104.2 forwards the first request or the second request to the end user application program 106.2 based on the mapping. The mapping may be technologically advantageous where the first request or the second request is mandated by the second entity identifier to be managed (e.g., fulfilled, dispensed, supplied, provided) by the second end user operating the end user application program 106.2 and not the first end user operating the end user application program 104.2.

Another example may involve this at least one rule of the second set of rules enable the rules engine 110.2 to perform a comparison of an estimated geographic distance value between a first physical address sourced (e.g., copied, formatted) from the first request locating the computing terminal 104, which may include its locale information, and a second physical address locating the computing terminal 106, which may include its locale information, where a computing terminal (e.g., the computing terminal 106 or another computing terminal) other than the computing terminal 104 capable of receiving the second request is physically located such that the end user application program 104.2 forwards the request to the end user application program 106.2 based on a physical geographic proximity according to the estimated distance value. The estimated distance value may be obtained from a geographical map logic (e.g., an API, a software engine, a web application, Google Maps interface) local or remote to the rules engine 110.2. The comparison may be technologically advantageous where the first request or the second request is desired to be fulfilled (e.g., dispensed, supplied, provided) at a location physically closest to the computing terminal 104, yet also capable of fulfilling the first request or the second request (e.g., adequate staff and inventory during working hours).

Yet another example may involve this at least one rule of the second set of rules enable the rules engine 110.2 to keep a first count (e.g., incrementing whole numbers by one) of successfully completed transactions associated with the computing terminal 104, which may include the OS 104.1 or the end user application 104.2 or its locale information, and a second count of successfully completed transactions (e.g., incrementing whole numbers by one) associated with the computing terminal 106, which may include the OS 106.1 or the end user application 106.2 or its locale information. As such, the end user application program 104.2 may forward the first request or the second request to the end user application program 106.2 to keep at least one of (i) the first count and the second count balanced with each other, which may be technologically advantageous for load balancing to minimize computational or fulfillment (e.g., dispensation, provisional) overwhelming, or (ii) the first count or the second count under a predetermined threshold of successfully completed transactions respectively associated with the computing terminal 104, which may include the OS 104.1 or the end user application program 104.2, or the second computing terminal, which may include the OS 106.1 or the end user application program 106.2, which may be technologically advantageous for load balancing to minimize computational or fulfillment (e.g., dispensation, provisional) overwhelming.

Still another example may involve this at least one rule of the second set of rules enable the rules engine 110.2 to keep a first history (e.g., a log, a ledger) of successfully completed transactions associated with the computing terminal 104, which may include the OS 104.1 or the end user application program 104.2 or its locale information, and a second history (e.g., a log, a ledger) of successfully completed transactions associated with the computing terminal 106.2, which may include the OS 106.1 or the end user application program 106.2 or its locale information. As such, the end user application program 104.1 may forward the first request or the second request to the end user application program 106.2 based on the second history being indicative of more successfully completed transactions than the first history. This approach may be technologically advantageous to maximize proper fulfillment or dispensation of physical objects and minimize latency of the network 102 due to potentially more unneeded requests.

In block 204 of the process 400B, the end user application program 106.2 submits the second request (or a copy thereof) to the routing application program 108.2 similar to the block 204 of the process 200, on repetition or iteration.

In block 206 of the process 400B, the routing application program 108.2 receives the second request (or a copy thereof) similar to the block 206 of the process 200, on repetition or iteration.

In block 208 of the process 400B, the routing application program 108.2 generates the second communication based on the second request similar to the block 208 of the process 200, on repetition or iteration.

In block 210 of the process 400B, the routing application program 108.2 sends the second communication (or a copy thereof) to the rules engine 110.2 similar to the block 210 of the process 200, on repetition or iteration.

In block 212 of the process 400B, the rules engine 110.2 receives the second communication (or a copy thereof) and determines whether either the first set of rules or the second set of rules is applicable to the second communication, but not both, similar to the block 212 of the process 200, on repetition or iteration.

In block 214 of the process 400B, the rules engine 110.2 generates either the third response or the fourth response, but not both, similar to the block 214 of the process 200, on repetition or iteration. The third response has the third binary content responsive to the second communication based on the first set of rules being applicable to the second communication, similar to the block 214 of the process 200, on repetition or iteration. The fourth response has the fourth binary content and the second help content responsive to the second communication, where the fourth binary content is opposite the third binary content and the second help content is generated based on the second set of rules being applicable to the second communication, similar to the block 214 of the process 200, on repetition or iteration. For example, the first binary content or the third binary content may indicate the approval of the transaction associated with the profile, as explained above. For example, since the transaction is initiated based on the first request, the second binary content or the fourth binary content may indicate the denial of the transaction, as explained above. For example, the first request or the second request may be formatted in a one format (e.g., a flat file format, a NCPDP format, a matrix format) and the first communication or the second communication may be formatted in another format (e.g., a delimited format, a JSON format, a CSV format, an XML format), as explained above.

There may be a situation when the rules engine 110.2 receives the first communication at a first point in time (e.g., 9:00 am ET on Jan. 1, 2025) and the second communication at a second point in time (e.g., 9:05 am ET on Jan. 2, 2025), which may be too close to each other in terms of time, thereby indicating the second communication may be spam or fraudulent. As such, to minimize spam or fraud, the second set of rules may have a rule mandating a passage of a predetermined time interval (e.g., 10 minutes, 30 minutes, 1 hour, 4 hours, 12 hours, 24 hours, 48 hours, 7 days) between the first point in time and the second point time to enable (e.g., permit, permission, authorize, allow, semaphore) the rule engine 110.2 to generate the third response. The predetermined time interval may set by a computing terminal (e.g., operated via a superuser or administrator account) other than the computing terminal 104 and the computing terminal 106, and communicating with the network 102 similar to the computing terminal 104 and the computing terminal 106.

In block 216 of the process 400B, the rules engine 110.2 sends either the third response (or a copy thereof) or the fourth response (or a copy thereof) to the routing application program 108.2, similar to the block 216 of the process 200, on repetition or iteration.

In block 218 of the process 400B, the routing application program 108.2 receives either the third response (or a copy thereof) or the fourth response (or a copy thereof) and generates either the third reply to the second request based on the third response where the third reply contains the third binary content or the fourth reply to the second request based on the fourth response where the fourth reply contains the fourth binary content and the second help content, similar to the block 218 of the process 200, on repetition or iteration. For example, the first response or the second response may be formatted in one format (e.g., a delimited format, a JSON format, a CSV format, an XML format) and the first reply or the second reply may be formatted in another format (e.g., a flat file format, a NCPDP format, a matrix format), as explained above.

In block 220 of the process 400B, the routing application program 108.2 sends either the third reply (or a copy thereof) or the fourth reply (or a copy thereof) to the end user application program 106.2, similar to the block 220 of the process 200, on repetition or iteration.

In block 222 of the process 400B, the end user application program 106.2 receives either the third reply (or a copy thereof) or the fourth reply (or a copy thereof) and displays either the third message containing the third binary content sourced from the third reply or the fourth message containing the fourth binary content and the second help content sourced from the fourth reply, similar to the block 222 of the process 200, on repetition or iteration.

In block 224 of the process 400B, the end user application program 106.2 determines whether any help content is received in or displayed by the third reply or the fourth reply (e.g., by a data field dedicated to storage of help content having or lacking data or certain type of data). If yes, then block A is performed, which leads to restart of the process 400B, but now using the second help to complete the transaction originating based on the first request sourced from the end user application program 104.2 running on the computing terminal 104. If no, then block 226 of the process 400B is performed.

In block 226 of the process 400B, the transaction is determined to be completed by the end user application program 104.2, the end user application program 106.2, the routing application program 108.2, or the rules engine 110.2. As such, another transaction for a same or another profile can be requested, which may occur via performance of the block 202 again to start the process 400A or 400B again in either direction (e.g., 400A leads to 400B or 400B leads to 400A).

Although the first reply, the second reply, the third reply, or the fourth reply does not contain the tokenized URL, as explained above, this configuration is not required, as explained above. As such, the first reply, the second reply, the third reply, or the fourth reply may contain the tokenized URL unique to the first request or the second request, as explained above. For example, the first reply, the second reply, the third reply, or the fourth reply may be formatted in a NCPDP format and have an Additional Message Information (AMI) field (e.g., 526-FQ field) containing the tokenized URL. For example, the tokenized URL may be activatable at the end user application program 104.2 or the end user application program 106.2 to present the web form within the end user application program 104.2 or the end user application program 106.2, where the web form is associated with the profile based on the first request or the second request and completable from within the end user application program 104.2 or the end user application program 106.2, as explained above. For example, the tokenized URL may be activatable at the end user application program 104.2 or the end user application program 106.2 to present the web form within another end user application program, such as the end user application program 104.2 or the end user application program 106.2, which may allow this transaction to "bounce around" between end user application program until competition, as explained above. For example, the other end user application program may be running on the computing terminal 104, the computing terminal 106, or another computing terminal similar to the computing terminal 104 or the computing terminal 106. As such, the web form may be associated with the profile based on the first request or the second request and completable from within the other end user application program, where the computing terminal 104 or the computing terminal 106 or the other computing terminal hosts the other end user application program, as explained above.

Figure 5:
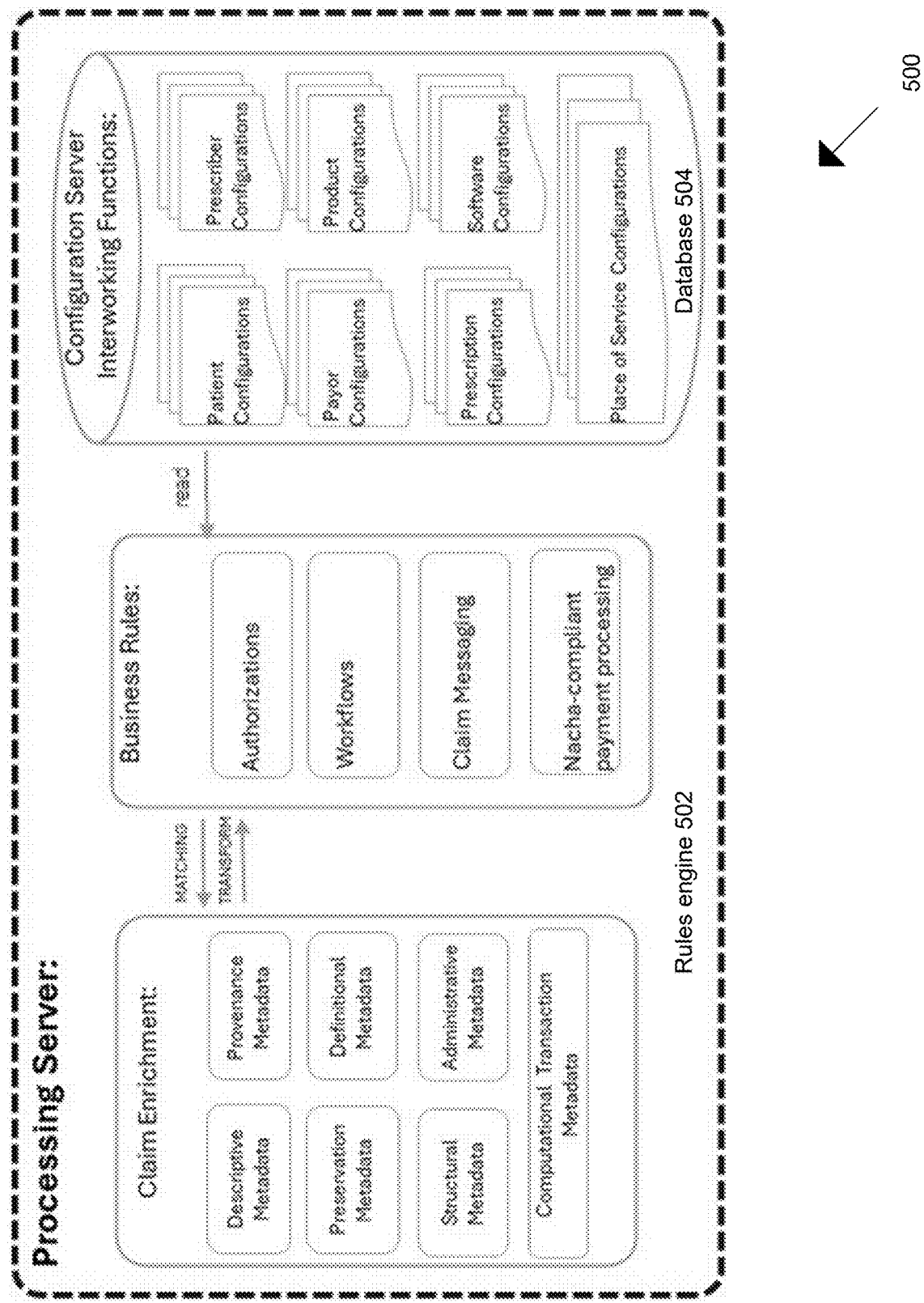
FIG. 5 shows a diagram of an embodiment of a rules engine and an embodiment of a database each configured for use in the system of FIG. 1 or FIG. 3 according to this disclosure.

FIG. 5 shows a diagram of an embodiment of a rules engine and an embodiment of a database each configured for use in the system of FIG. 1 or FIG. 3 according to this disclosure. In particular, there is a diagram 500 schematically illustrating a rules engine 502 and a database 504 each usable by the systems 100 or 300. As shown in FIG. 5, there is a server hosting the rules engine 502 and the database 504. However, note that such configuration is not required and there may be one server hosting the rules engine 502 and another server hosting the database 504, where the rules engine 502 is enabled to interface with the database 504, as disclosed herein.

As explained above, the rules engine 502 may be embodied as the rules engines 108.2 or 110.2 and store various metadata (e.g., descriptive, preservation, structural, provenance, definitional, administrative, computational transaction) and various business rules (e.g., authorization rules, workflow rules, messaging rules, standard compliance rules), which enable the rules engine 502 to enrich of messages received from the routing application programs 106.2 or 108.2. For example, the rules engine 502 may receive a message (e.g., a communication) from a routing application program, as disclosed herein, and enrich the message with at least some metadata (e.g., descriptive, preservation, structural, provenance, definitional, administrative, computational transaction) to transform (e.g., augment, supplement) the message. Then, the rules engine 502 may apply at least some business rules to the message, as transformed, where such application may involve querying the database 504, as needed.

As explained above, the database 504 may have a schema (e.g., flat, hierarchical, network, relational, star, snowflake) according to which the database 504 stores its records. For example, in context of medical claim processing, the database 504 may have a set of tables (e.g., related to each other by a primary key) storing data (e.g., textual, structured, unstructured, descriptive) for configurations of patient profiles, a set of tables (e.g., related to each other by a primary key) storing data (e.g., textual, structured, unstructured, descriptive) for configurations of payor profiles, a set of tables (e.g., related to each other) storing data (e.g., textual, structured, unstructured, descriptive) for configurations of prescription profiles, a set of tables (e.g., related to each other by a primary key) storing data (e.g., textual, structured, unstructured, descriptive) for configurations of prescriber profiles, a set of tables (e.g., related to each other by a primary key) storing data (e.g., textual, structured, unstructured, descriptive) for configurations of product profiles, a set of tables (e.g., related to each other by a primary key) storing data (e.g., textual, structured, unstructured, descriptive) for configurations of pharmacy software (e.g., input parameters, processing parameters, output parameters), and a set of tables (e.g., related to each other) storing data (e.g., textual, structured, unstructured, descriptive) for configurations of place of profiles. At least two of these sets of tables may be related to each other (e.g., via a primary key).

As explained above, the database 504 may have the schema be a relational schema enabling storage and manage of various data elements involved. For example, there may be a patient information schema involving a patient table (e.g., patient_id, name, date_of_birth, gender, address), an insurance table (e.g., insurance_id, policy_number, group_number), and a patient_insurance table (e.g., patient_id, insurance_id) to link patients to their insurance policies. For example, there may be a provider information schema involving a provider table (e.g., provider_id, name, NPI, specialty, taxonomy_code, address). For example, there may be a service details schema involving a claim table (e.g., claim_id, patient_id, provider_id, service_date, total_charges), a diagnosis table (e.g., diagnosis_id, diagnosis_code, description), a claim_diagnosis table (e.g., claim_id, diagnosis_id) to link claims to diagnoses, a procedure table (e.g., procedure_id, procedure_code, description), and a claim_procedure table (e.g., claim_id, procedure_id, charges, modifiers) to link claims to procedures. For example, there may be a billing information schema involving a payment table (e.g., payment_id, claim_id, amount_paid, date_paid), an adjustment table (e.g., adjustment_id, claim_id, adjustment_code, amount) for claim adjustments. Resultantly, such schemas enable at least partial capture of relevant metadata required for medical claim processing, such as patient demographics, insurance details, provider information, diagnosis and procedure codes, service dates, charges, payments, and adjustments. Normalization principles may be applied to avoid data redundancy and maintain data integrity.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to be-come coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network, a neutrino network, an optical network (e.g., Li-Fi, fiberoptics), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or pro-gram statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of this disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as dis-closed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required be-fore, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, skilled persons know that various modifications, additions, substitutions and the like can be made without departing from spirit of this disclosure. As such, these are considered to be within the scope of the disclosure, as defined in the following claims.

What is claimed is:

1. A system, comprising:
   a computing terminal hosting an end user application program;
   a first server hosting a routing application program; and
   a second server hosting a rules engine containing a first set of rules and a second set of rules, wherein the routing application program is programmed to receive a first request associated with a profile from the end user application program, generate a first communication based on the first request, and send the first communication to the rules engine such that:
   (i) the rules engine (a) receives the first communication, (b) determines whether either the first set of rules or the second set of rules is applicable to the first communication, (c) generates either (1) a first response with a first binary content to the first communication based on the first set of rules being applicable to the first communication or (2) a second response with a second binary content and a first help content to the first communication where the second binary content is opposite the first binary content and the first help content is generated based on the second set of rules being applicable to the first communication, and (d) sends either the first response or the second response to the routing application program, (ii) the routing application program (a) receives either the first response or the second response, (b) generates either (1) a first reply to the first request based on the first response where the first reply contains the first binary content or (2) a second reply to the first request based on the second response where the second reply contains the second binary content and the first help content, and (c) sends either the first reply or the second reply to the end user application program, (iii) the end user application program (a) receives either the first reply or the second reply, (b) displays either (1) a first message containing the first binary content sourced from the first reply or (2) a second message containing the second binary content and the first help content sourced from the second reply, (c) generates a second request associated with the profile based on the first request, the second binary content, and the first help content, and (d) submits the second request to the routing application program, (iv) the routing application program (a) receives the second request, (b) generates a second communication based on the second request, and (c) sends the second communication to the rules engine, (v) the rules engine (a) receives the second communication, (b) determines whether either the first set of rules or the second set of rules is applicable to the second communication, (c) generates either (1) a third response with a third binary content to the second communication based on the first set of rules being applicable to the second communication or (2) a fourth response with a fourth binary content and a second help content to the second communication where the fourth binary content is opposite the third binary content and the second help content is generated based on the second set of rules being applicable to the second communication, and (d) sends either the third response or the fourth response to the routing application program, (vi) the routing application program (a) receives either the third response or the fourth response, (b) generates either (1) a third reply to the second request based on the third response where the third reply contains the third binary content or (2) a fourth reply to the second request based on the fourth response where the fourth reply contains the fourth binary content and the second help content, and (c) sends either the third reply or the fourth reply to the end user application program, and (vii) the end user application program (a) receives either the third reply or the fourth reply and (b) displays either (1) a third message containing the third binary content sourced from the third reply or (b) a fourth message containing the fourth binary content and the second help content sourced from the fourth reply.

2. The system of claim 1, wherein the first binary content or the third binary content indicates an approval of a transaction associated with the profile, wherein the transaction is initiated based on the first request, wherein the second binary content or the fourth binary content indicates a denial of the transaction.

3. The system of claim 1, wherein the second request augments or supplements the first request based on the first help content.

4. The system of claim 1, wherein the first reply, the second reply, the third reply, or the fourth reply does not contain a tokenized Uniform Resource Locator (URL).

5. The system of claim 1, wherein the first reply, the second reply, the third reply, or the fourth reply contains a tokenized Uniform Resource Locator (URL) unique to the first request or the second request.

6. The system of claim 5, wherein the tokenized URL is activatable at the end user application program to present a web form within the end user application program, wherein the web form is associated with the profile based on the first request or the second request and completable from within the end user application program.

7. The system of claim 5, wherein the end user application program is a first end user application program, wherein the computing terminal hosts a second end user application program, wherein the tokenized URL is activatable at the first end user application program to present a web form within the second end user application program, wherein the web form is associated with the profile based on the first request or the second request and completable from within the second end user application program.

8. The system of claim 5, wherein the computing terminal is a first computing terminal, wherein the end user application program is a first end user application program, and further comprising:
 a second computing terminal hosting a second end user application program, wherein the tokenized URL is activatable at the first end user application program to present a web form within the second end user application program, wherein the web form is associated with the profile based on the first request or the second request and completable from within the second end user application program.

9. The system of claim 1, wherein each of the first request and the second request is formatted as a data file containing a set of segments where the set of segments contains a set of fields where each field in the set of fields contains a single data element where the set of fields and the set of segments are separated by a set of alphanumeric characters.

10. The system of claim 9, wherein the data file is compliant with a National Council for Prescription Drug Programs (NCPDP) format.

11. The system of claim 1, wherein the computing terminal is a first computing terminal operated by a first end user, wherein the end user application program is a first end user application program, and further comprising:
 a second computing terminal hosting a second end user application program operated by a second end user, wherein the first computing terminal is not collocated with the second computing terminal, wherein the first help content instructs the first end user to operate the first end user application program to forward the request to the second end user application program based on at least one rule of the second set of rules being applicable to the first communication.

12. The system of claim 11, wherein the at least one rule of the second set of rules is a mapping between a first entity identifier associated with the second computing terminal and a second entity identifier such that the first end user application program forwards the request to the second end user application program based on the mapping.

13. The system of claim 11, wherein the at least one rule of the second set of rules enables the rules engine to perform a comparison of an estimated distance value between a first physical address sourced from the first request and a second physical address where a computing terminal other than the first computing terminal capable of receiving the second request is physically located such that the first end user application program forwards the request to the second end user application program based on a physical proximity according to the estimated distance value.

14. The system of claim 11, wherein the at least one rule of the second set of rules enables the rules engine to keep a first count of successfully completed transactions associated with the first computing terminal and a second count of successfully completed transactions associated with the second computing terminal such that the first end user application program forwards the request to the second end user application program to keep at least one of (i) the first count and the second count balanced with each other or (ii) the first count or the second count under a predetermined threshold of successfully completed transactions respectively associated with the first computing terminal or the second computing terminal.

15. The system of claim 11, wherein the at least one rule of the second set of rules enables the rules engine to keep a first history of successfully completed transactions associated with the first computing terminal and a second history of successfully completed transactions associated with the second computing terminal such that the first end user application program forwards the request to the second end user application program based on the second history being indicative of more successfully completed transactions than the first history.

16. The system of claim 1, wherein the rules engine receives the first communication at a first point in time and the second communication at a second point in time, wherein the second set of rules has a rule mandating a passage of a predetermined time interval between the first point in time and the second point time to enable the rule engine to generate the third response, wherein the predetermined time interval is set by a computing terminal other than the computing terminal.

17. A system, comprising:
a first computing terminal hosting a first end user application program;
a second computing terminal hosting a second end user application program;
a first server hosting a routing application program; and
a second server hosting a rules engine containing a first set of rules and a second set of rules, wherein the routing application program is programmed to receive a first request associated with a profile from the first end user application program, generate a first communication based on the first request, and send the first communication to the rules engine such that:
 (i) the rules engine (a) receives the first communication, (b) determines whether either the first set of rules or the second set of rules is applicable to the first communication, (c) generates either (1) a first response with a first binary content to the first communication based on the first set of rules being applicable to the first communication or (2) a second response with a second binary content and a first help content to the first communication where the second binary content is opposite the first binary content and the first help content is generated based on the second set of rules being applicable to the first communication, and (d) sends either the first response or the second response to the routing application program,
 (ii) the routing application program (a) receives either the first response or the second response, (b) generates either (1) a first reply to the first request based on the first response where the first reply contains the first binary content or (2) a second reply to the first request based on the second response where the second reply contains the second binary content and the first help content, and (c) sends either the first reply or the second reply to the first end user application program,
 (iii) the first end user application program (a) receives either the first reply or the second reply, (b) displays either (1) a first message containing the first binary content sourced from the first reply or (b) a second message containing the second binary content and the first help content sourced from the second reply,
 (iv) the second end user application program (a) generates a second request associated with the profile based on the first request, the second binary content, and the first help content and (b) submits the second request to the routing application program,
 (v) the routing application program (a) receives the second request, (b) generates a second communication based on the second request, and (c) sends the second communication to the rules engine,
 (vi) the rules engine (a) receives the second communication, (b) determines whether either the first set of rules or the second set of rules is applicable to the second communication, (c) generates either (1) a third response with a third binary content to the second communication based on the first set of rules being applicable to the second communication or (2) a fourth response with a fourth binary content and a second help content to the second communication where the fourth binary content is opposite the third binary content and the second help content is generated based on the second set of rules being applicable to the second communication, and (d) sends either the third response or the fourth response to the routing application program,
 (vii) the routing application program (a) receives either the third response or the fourth response, (b) generates either (1) a third reply to the second request based on the third response where the third reply contains the third binary content or (2) a fourth reply to the second request based on the fourth response where the fourth reply contains the fourth binary content and the second help content, and (c) sends either the third reply or the fourth reply to the second end user application program, and
 (vii) the second end user application program (a) receives either the third reply or the fourth reply and (b) displays either (1) a third message containing the third binary content sourced from the third reply or (b) a fourth message containing the fourth binary content and the second help content sourced from the fourth reply.

18. The system of claim 17, wherein the first computing terminal and the second computing terminal are physically collocated within a defined physical area.

19. The system of claim 17, wherein the first computing terminal and the second computing terminal are not physically collocated within a defined physical area.

20. The system of claim 19, wherein the first help content instructs the first end user to operate the first end user application program to forward the request to the second end user application program based on at least one rule of the second set of rules being applicable to the first communication.

21. The system of claim 20, wherein the at least one rule of the second set of rules is a mapping between a first entity identifier associated with the second computing terminal and a second entity identifier such that the first end user application program forwards the request to the second end user application program based on the mapping.

22. The system of claim 20, wherein the at least one rule of the second set of rules enables the rules engine to perform a comparison of an estimated distance value between a first physical address sourced from the first request and a second physical address where a computing terminal other than the first computing terminal capable of receiving the second request is physically located such that the first end user application program forwards the request to the second end user application program based on a physical proximity according to the estimated distance value.

23. The system of claim 20, wherein the at least one rule of the second set of rules enables the rules engine to keep a first count of successfully completed transactions associated with the first computing terminal and a second count of successfully completed transactions associated with the second computing terminal such that the first end user application program forwards the request to the second end user application program to keep at least one of (i) the first count and the second count balanced with each other or (ii) the first count or the second count under a predetermined threshold of successfully completed transactions respectively associated with the first computing terminal or the second computing terminal.

24. The system of claim 20, wherein the at least one rule of the second set of rules enables the rules engine to keep a first history of successfully completed transactions associated with the first computing terminal and a second history of successfully completed transactions associated with the second computing terminal such that the first end user application program forwards the request to the second end user application program based on the second history being indicative of more successfully completed transactions than the first history.

25. The system of claim 17, wherein the rules engine receives the first communication at a first point in time and the second communication at a second point in time, wherein the second set of rules has a rule mandating a passage of a predetermined time interval between the first point in time and the second point time to enable the rule engine to generate the third response, wherein the predetermined time interval is set by a computing terminal other than the computing terminal.

26. The system of claim 17, wherein the first reply, the second reply, the third reply, or the fourth reply contains a tokenized Uniform Resource Locator (URL) unique to the first request or the second request, wherein at least one of (a) the tokenized URL is activatable at the first end user application program or the second end user application program to present a web form within the first end user application program or the second end user application program, wherein the web form is associated with the profile based on the first request or the second request and completable from within the first end user application program or the second end user application program, or (b) the tokenized URL is activatable at the first end user application program or the second end user application program to present a web form within the first end user application program or the second end user application program, wherein the web form is associated with the profile based on the first request or the second request and completable from within the first end user application program or the second end user application program.

27. The system of claim 17, wherein the second end user application program generates the second request based on communicating with the first end user application program.

28. The system of claim 27, wherein the second end user application program generates the second request based on receiving the second binary content or the first help content from the first end user application program.

29. The system of claim 17, wherein the second end user application program generates the second request based on the second end user application program receiving an end user input associated with the second binary content or the first help content from the first end user application program.

30. The system of claim 29, wherein the first end user application program is operated by a first user, wherein the second end user application program is operated by a second user, wherein the end user input involves a call between the first user and the second user.

* * * * *